(12) United States Patent
Aoki et al.

(10) Patent No.: US 7,982,590 B2
(45) Date of Patent: Jul. 19, 2011

(54) OCCUPANT RESTRAINT SYSTEM

(75) Inventors: Hiroshi Aoki, Tokyo (JP); Kazuya Oi, Tokyo (JP)

(73) Assignee: Takata Coporation, Tokyo (JP)

( * ) Notice: Subject to any disclaimer, the term of this patent is extended or adjusted under 35 U.S.C. 154(b) by 330 days.

(21) Appl. No.: 12/232,428

(22) Filed: Sep. 17, 2008

(65) Prior Publication Data

US 2009/0102631 A1   Apr. 23, 2009

(30) Foreign Application Priority Data

Oct. 22, 2007   (JP) .................................. 2007-274521

(51) Int. Cl.
*B60Q 1/00* (2006.01)
(52) U.S. Cl. ..................... 340/436; 180/268; 180/271
(58) Field of Classification Search .................. 340/436, 340/437, 665; 280/728.1; 200/52 R, 61.44, 200/61.45 R; 180/274, 232, 268, 271; 701/301, 701/45; 296/187.03, 146.5
See application file for complete search history.

(56) References Cited

U.S. PATENT DOCUMENTS

| | | | | |
|---|---|---|---|---|
| 5,281,780 A | * | 1/1994 | Haland | 200/52 R |
| 5,335,749 A | * | 8/1994 | Taguchi et al. | 180/274 |
| 5,419,407 A | * | 5/1995 | Meyer et al. | 180/274 |
| 5,680,909 A | * | 10/1997 | Lofy | 180/274 |
| 5,707,076 A | | 1/1998 | Takahashi | |
| 7,131,512 B2 | | 11/2006 | Aoki | |
| 7,137,472 B2 | * | 11/2006 | Aoki | 180/274 |
| 2007/0023224 A1 | | 2/2007 | Aoki et al. | |
| 2008/0029329 A1 | | 2/2008 | Aoki et al. | |
| 2008/0030312 A1 | | 2/2008 | Aoki | |
| 2008/0215211 A1 | | 9/2008 | Willerton et al. | |

FOREIGN PATENT DOCUMENTS

| | | |
|---|---|---|
| GB | 2 353 362 A | 2/2001 |
| JP | 5-93735 | 4/1993 |
| JP | 7-172262 | 7/1995 |
| JP | 9-58400 | 3/1997 |
| JP | 2004-3938 | 1/2004 |
| JP | 2004-3942 | 1/2004 |
| JP | 2007-33271 | 2/2007 |
| JP | 2008-37180 | 2/2008 |
| JP | 2008-37181 | 2/2008 |
| JP | 2008-506592 | 3/2008 |

* cited by examiner

*Primary Examiner* — Toan N Pham
(74) *Attorney, Agent, or Firm* — Foley & Lardner LLP

(57) ABSTRACT

A side impact detection system for detecting information about a side impact of a vehicle. The side impact detection system comprises a elongated member, a detection sensor, a deriving unit, and a determination unit. The elongated member is capable of being deflected toward the inside of the vehicle according to the deformation of the door outer panel in the event of a side impact. The detection sensor detects information about the displacement of a setting area that is previously set on the elongated member during the deflection of the elongated member toward the inside of the vehicle. The deriving unit derives the displacement and the displacement speed of the setting area relative to a vehicle body side member based on the information detected by the detection sensor. The determination unit determines the mode of the side impact on the vehicle based on the information derived by the deriving unit.

16 Claims, 19 Drawing Sheets

OCCUPANT RESTRAINT SYSTEM

BACKGROUND

The present disclosure relates to a technology for detecting a side impact on a vehicle.

Conventionally, there are known various vehicle impact sensors for detecting occurrence of a collision in the event of a vehicle accident. For example, disclosed in Japanese Patent Application No. 2007-172262, incorporated by reference herein, is a system for detecting a side impact on the vehicle with a G sensor or a contact sensor that is actuated in a vehicle side impact crash.

However, if a vehicle occupant is restrained by an occupant restraint system such as an airbag module in a vehicle accident, an advanced detecting technology is desired which is capable of immediately detecting occurrence of a collision on the vehicle in order to improve the occupant restraining property. In a side impact crash as described in Japanese Application 2007-172262, there is nothing between a vehicle occupant and a colliding object but a vehicle door. In addition, especially in case of a side impact in which a colliding object such as a utility pole collides with a vehicle door from a side, the intrusion of the colliding object into a vehicle inner side of the vehicle door is quick. Therefore, in case of a side impact crash, it is required to determine the mode of the side impact crash in a shorter time than that for a head-on crash. Therefore, it is desired to properly determine whether the occurred side impact is likely to need to immediately restrain the vehicle occupant or is a minor impact which is not likely to need or does not need to immediately restrain the vehicle occupant, taking into consideration that the vehicle door is easily displaced even with an impact by an object other than road structures and roadside structures, for example, a shopping cart, a ball, or a bat.

It would be desirable to provide a technology to quickly and properly detect the impact mode in the event of a vehicle side impact crash.

SUMMARY

One embodiment relates to a side impact detection system for detecting information about a side impact of a vehicle. The side impact detection system comprises an elongated member, a detection sensor, a deriving unit, and a determination unit. The elongated member is disposed to extend between a door front end and a door rear end in a space defined by a door outer panel and a door inner panel of a vehicle door. The elongated member is capable of being deflected toward the inside of the vehicle according to the deformation of the door outer panel in the event of a vehicle side impact crash. The detection sensor detects information about the displacement of a setting area that is previously set on the elongated member during the deflection of the elongated member toward the inside of the vehicle. The deriving unit derives the displacement and the displacement speed of the setting area relative to a vehicle body side member based on the information detected by the detection sensor. The determination unit determines the mode of the side impact on the vehicle based on the information derived by the deriving unit.

Another embodiment relates to an occupant restraint system comprising a side impact detection system; an occupant restraint apparatus for restraining a vehicle occupant in the event of a vehicle side impact crash; and a control device for controlling the occupant restraint apparatus based on information determined by the determination unit of the side impact detection system.

Still another embodiment relates to a vehicle comprising an engine/running system; an electrical system; an actuation control device for conducting the actuation control of the engine/running system and the electrical system; a vehicle door for allowing a vehicle occupant to get in or get out the vehicle which can be displaced by a vehicle side impact; a sensor device for detecting information about displacement of the vehicle door; and a control signal output device. The control output device for outputs a control signal to an object to be controlled based on the information detected by the sensor device. The sensor device comprises a side impact detection system.

Yet another embodiment relates to a side impact detection method for detecting information about a side impact on a vehicle. A setting area is previously set on a elongated member that extends between a door front end and a door rear end in a space defined by a door outer panel and a door inner panel of a vehicle door, the elongated member being capable of being deflected toward the inside of the vehicle according to the deformation of the door outer panel in the event of a vehicle side impact crash. A detection sensor for detecting information about the displacement of the setting area toward the inside of the vehicle is disposed on an area of the door inner panel confronting the setting area or arranged integrally with the setting area. The method comprises a step for detecting information about the displacement of the setting area toward the inside of the vehicle by the detection sensor during the deflection of the elongated member toward the inside of the vehicle; a step for deriving the displacement and the displacement speed of the setting area relative to a vehicle body side member based on the detected information; and a step for determining the mode of the side impact on the vehicle based on the derived information.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
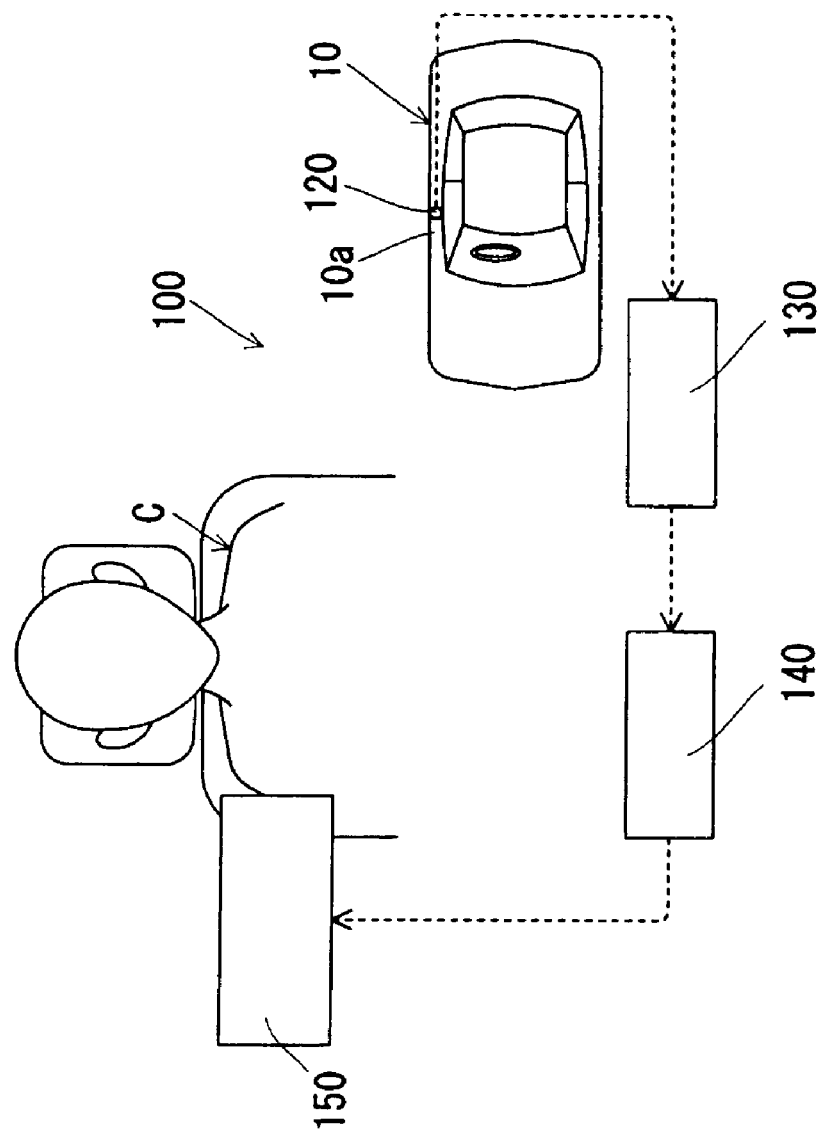
FIG. 1 is an illustration schematically showing an occupant restraint system according to an embodiment installed in a vehicle in which a vehicle occupant is seating.

Though the present application refers to technology for detecting information about a side impact occurred on an automobile, the technology disclosed herein can be also adapted to a technology for detecting information about a side impact occurred on a vehicle other than the automobile. The vehicle may be one of various vehicles such as, for example, an automobile, airplane, a boat, a train, a bus, and a truck.

A side impact detection system includes a system for detecting information about a side impact on a vehicle and comprises at least an elongated member, a detection sensor, a deriving unit, and a determining unit.

The elongated member is disposed to extend between a door front end and a door rear end in a space defined by a door outer panel and a door inner panel of a vehicle door. The elongated member is capable of being deflected toward the inside of the vehicle (i.e. be deformed into an arched shape) according to the deformation of the door outer panel in the event of a vehicle side impact crash. The elongated member may be provided in a generally horizontal orientation. The elongated member is typically also used as a reinforcing member such as a door beam to reinforce the vehicle door. Alternatively, the elongated member may be a member which is disposed to extend between the door front end and the door rear end in the space, defined by the door outer panel and the door inner panel of the vehicle door, in addition to a reinforcing member such as a door beam.

The detection sensor detects information about displacement of a setting area. According to one exemplary embodiment, the setting area can be provided on the elongated member. According to other exemplary embodiments, the setting area may be the elongated member itself or another member fixed to the elongated member. The detection sensor may be disposed on the elongated member or on the door inner panel. The information about the displacement of the setting area described herein may include widely information directly or indirectly indicating the displacement, the displacement speed, and the displacement acceleration about the movement of the setting area caused by the deflection of the elongated member relative to the both ends of the elongated member. The detection sensor described herein may be a single detection sensor or a combination of a plurality of detection sensors. Therefore, one or more of various sensors, such as coil sensors, acceleration sensors, strain sensors, ultrasonic sensors, and optical sensors may be used as the detection sensor. In case of using a plurality of detection sensors, the detection sensors may be of the same kind or of different kinds.

The deriving unit derives the deflection displacement of the elongated member indirectly as the displacement (sometimes referred to as the amount of displacement) and the displacement speed of the setting area relative to a vehicle body side member based on the information detected by the detection unit. The vehicle body side member described herein widely includes a member such as a door frame and a door inner panel to which the both ends of the elongated member are fixed and a member such as a vehicle body that is connected to the elongated member by lock hinges.

The determination unit determines the mode of the side impact on the vehicle based on the information derived by the deriving unit. Typically, the determination unit determines whether the occurred side impact is likely to need to immediately restrain a vehicle occupant or is a minor impact which is not likely to need or does not need to immediately restrain the vehicle occupant, or whether the occurred side impact collides with an object being a road structure or a roadside structure or an object other than road structures and roadside structures. The information about the mode of the side impact on the vehicle may be suitably used to control occupant restraint apparatuses such as an airbag module and a seat belt device which are actuated for restraining the vehicle occupant in the event of a vehicle side impact crash, to control a warning device for outputting warning such as display and sound for informing the vehicle occupant of a vehicle side impact crash, and to control another object to be controlled.

According to the aforementioned structure of the side impact detection system, it is possible to quickly and properly determine the mode of a side impact when the vehicle is involved in a side impact crash. That is, by providing the setting area on the elongated member, which is capable of being deflected toward the inside of the vehicle according to the deformation of the door outer panel in the event of a vehicle side impact crash, and by detecting information about displacement of the setting area by means of the detection sensor (i.e. monitoring the setting area) it is possible to quickly and properly determine the mode of the side impact. In addition, since the determination of the mode of the side impact on the vehicle is made based on the information of both the displacement and the displacement speed of the setting area relative to the vehicle body side member which is derived by the deriving unit, it is possible to properly determine whether the occurred side impact is likely to need to immediately restrain a vehicle occupant or is a minor impact which is not likely to need or does not need to immediately restrain the vehicle occupant, thereby effectively improving the accuracy of determination about the mode of the side impact. The elongated member spans a relatively long distance across the door. Therefore, by setting the setting area on the elongated member, it is possible to stably detect a side impact in a wide range of the vehicle door.

According to another exemplary embodiment, the detection sensor is preferably structured integrally with the setting area and is disposed to face a confronting surface of the inner panel and approaches the confronting surface of the inner panel during the deflection of the elongated member toward the inside of the vehicle to detect information about displacement of the setting area. In this case, the setting area may be the elongated member itself or another member fixed to the elongated member. According to this structure, by using the detection sensor structured integrally with the setting area on the elongated member, it is possible to quickly and properly detect the mode of the side impact on the vehicle.

According to another exemplary embodiment, the detection sensor may include a coil sensor which detects variation in electric current flowing through a coil disposed to face the confronting surface made of a metal and is adapted to detect information about displacement of the setting area based on the variation in electric current detected by the coil sensor during the deflection of the elongated member toward the inside of the vehicle. In this case, the confronting surface made of a metal is formed entirely or partly of a conductive member or a magnetic member containing, for example, steel, copper, aluminum, and/or ferrite.

Employing the coil sensor enables detection of only component approaching the coil during the deflection of the elongated member toward the inside of the vehicle. Further, the coil sensor may be a noncontact sensor and thus has characteristics that the coil sensor is resistant to shock, is not sensitive to the shock, and is hardly affected by environment. Therefore, the coil sensor is effective in ensuring the desired accuracy for detecting displacement information of the setting area.

According to another exemplary embodiment, the detection sensor may be disposed on the door inner panel to face the setting area and is adapted to detect information about the displacement of the setting area approaching the detection sensor during the deflection of the elongated member toward the inside of the vehicle. In this case, the detection sensor may be disposed directly on the door inner panel or on another member fixed to the door inner panel. According to this arrangement, by employing the detection sensor disposed on the door inner panel, it is possible to quickly and properly detect the mode of side impact in the event of a side impact crash of the vehicle The detection sensor may include a coil sensor that detects variation in electric current flowing through a coil disposed to face the setting area made of a metal and is adapted to detect information about displacement of the setting area based on the variation in electric current detected by the coil sensor during the deflection of the elongated member toward the inside of the vehicle. In this case, the setting area made of a metal is formed entirely or partly of a conductive member or a magnetic member containing, for example, steel, copper, aluminum, and/or ferrite.

Employing the coil sensor enables detection of only component approaching the coil during the deflection of the elongated member toward the inside of the vehicle. Further, the coil sensor is a noncontact sensor and thus has characteristics that the coil sensor is resistant to shock, is not sensitive to the shock, and is hardly affected by environment. Therefore, the coil sensor is effective in ensuring the desired accuracy for detecting displacement information of the setting area.

According to one exemplary embodiment, an occupant restraint system comprises at least: the side impact detection system as described above; an occupant restraint apparatus; and a control device.

The occupant restraint apparatus is an apparatus for restraining a vehicle occupant in the event of a vehicle collision. The occupant restraint apparatus described herein widely includes occupant restraint apparatuses such as an airbag device (airbag module) and a seat belt device. In case of employing an airbag device as the occupant restraint apparatuses, an airbag device in which an airbag is accommodated in a seat, a pillar, or an upper roof rail is employed.

The control device is controls the occupant restraint apparatus based on information determined by the determination unit of the side impact detection system (i.e. based on the mode of crash in the event of a side impact crash of the vehicle). Typically, the control device is adapted to output an actuation signal to the airbag device and/or the seat belt device when the determination unit determines that the occurred side impact is likely to need to immediately restrain the vehicle occupant. In addition, the control device may be adapted to change the occupant restraining mode of the airbag device and/or the seat belt device by estimating the impact energy based on the displacement information of the setting area in the event of the side impact crash. The control device may be provided exclusively for controlling the occupant restraint apparatus or may be an existing device for controlling the actuation of an engine/running system and an electrical system so that the existing device is also used for controlling the occupant restraint apparatus.

According to the side impact detection system having the aforementioned arrangement, the occupant restraint apparatus is controlled according to highly reliable information determined by the determination unit of the side impact detection system, thereby promoting complete restraint of a vehicle occupant.

According to an exemplary embodiment, a vehicle comprises: at least an engine/running system, an electrical system, an actuation control device, a vehicle door, a sensor device, and an actuation signal output device.

The engine/running system is a system including an engine and a running mechanism of the vehicle. The electrical system is a system involving electrical parts used in the vehicle. The actuation control device is a device having a function of controlling the actuation of the engine/running system and the electrical system. The vehicle door is a door for allowing a vehicle occupant to get in or out the vehicle and is displaceable according to a vehicle side impact. The sensor device is a device having a function of deriving information about displacement of the vehicle door. The sensor device comprises the aforementioned side impact detection system. The control signal output device is a device having a function of outputting a control signal to an object to be controlled based on the information derived by the sensor device. The object to be controlled described herein includes occupant restraint apparatuses such as an airbag module and a seat belt device which are actuated for restraining the vehicle occupant in the event of a vehicle side impact crash, and objects to be controlled such as a warning device for outputting warning such as display and sound for informing the vehicle occupant of a vehicle side impact crash. The control signal output device may be provided exclusively for controlling the occupant restraint apparatus or may be an existing device for controlling the actuation of an engine/running system and an electrical system so that the existing device is also used for controlling the occupant restraint apparatus.

According to this arrangement, a vehicle can be provided in which proper information determined by the determination unit of the side impact detection system is used for various controls with regard to the vehicle.

According to an exemplary embodiment, a side impact detection method detects information about a side impact on a vehicle. In this side impact detection method, a setting area is previously set on an elongated member which extends generally horizontally in a space defined by a door outer panel and a door inner panel of a vehicle door and which is capable of being deflected toward the inside of the vehicle according to the deformation of said door outer panel in the event of a vehicle side impact crash. Further, a detection sensor for detecting information about the displacement of the setting area toward the inside of the vehicle is disposed on an area of the door inner panel confronting the setting area or arranged integrally with the setting area. The method comprises a step for detecting information about the displacement of the setting area toward the inside of the vehicle by the detection sensor during the deflection of the elongated member toward the inside of the vehicle; a step for deriving the displacement and the displacement speed of the setting area relative to a vehicle body side member based on the detected information; and a step for determining the mode of the side impact on the vehicle based on the derived information.

According to the side impact detection method as mentioned above, it is possible to quickly and properly detect the mode of impact in the event of a vehicle side impact crash.

As described in the above, a setting area is previously set on a elongated member, that is disposed to extend between a door front end and a door rear end in a space defined by a door outer panel and a door inner panel of a vehicle door and is capable of being deflected toward the inside of the vehicle according to deformation of the door outer panel in the event of a vehicle side impact crash, and information about displacement of the setting area according to the deflection of the elongated member toward the inside of the vehicle is detected by the detection sensor, thereby enabling quick and proper detection of the mode of impact in the event of the vehicle side impact crash Hereinafter, description will be made as regard to an occupant restraint system 100 with reference to FIG. 1 through FIG. 7. This embodiment employs an airbag module with an airbag that can be deployed and inflated into an occupant restraint region in the event of a vehicle accident. Though the airbag module used for a vehicle occupant (driver) on a vehicle seat on a right side in a vehicle cabin is described in an example shown in FIG. 1, the occupant restraint system of this embodiment may be adapted to an airbag module for an occupant on any vehicle seat such as a driver's seat, a front passenger seat, or a rear seat.

An occupant restraint system 100 is schematically shown in FIG. 1 according to an exemplary embodiment installed in a vehicle 10 in which a vehicle occupant C is seating. As will be described in detail later, a displacement sensor 120 composing the occupant restraint system 100 is installed in a vehicle door 10a that is opened and closed for allowing a vehicle occupant C to get in or out the vehicle in this embodiment.

The vehicle 10 may include a number of vehicle components composing the vehicle, an engine/running system involving an engine and a running mechanism of the vehicle, an electrical system involving electrical parts used in the vehicle, and an actuation control means for conducting the actuation control of the engine/running system and the electrical system. Particularly in this embodiment, the occupant restraint system 100 is installed in the vehicle 10.

As shown in FIG. 1, the occupant restraint system 100 is configured to restrain the vehicle occupant C in the event of a side impact crash of the vehicle 10, according to information about the side impact of the vehicle 10. The occupant restraint system 100 comprises at least: the displacement sensor 120, a deriving unit 130, a determination unit 140, and an airbag module 150. The displacement sensor 120, the deriving unit 130, and the determination unit 140 among the components of the occupant restraint system 100 compose a side impact detection system for detecting information about the side impact on the vehicle 10.

As will be described in detail below, the displacement sensor 120 detects information about displacement, in the event of a side impact crash of the vehicle 10, of the vehicle door 10a. The displacement information detected by the displacement sensor 120 is transmitted to the deriving unit 130. Besides the displacement sensor 120, another sensor may be suitably installed in a vehicle body member such as a vehicle door, a rim, or a pillar to detecting information about the vehicle side impact. The displacement sensor 120 described herein is a detection sensor and/or a sensor device.

The deriving unit 130 derives the relative displacement or the amount of displacement and the displacement speed relative to the vehicle body member when the vehicle door 10a displaces toward the inner side of the vehicle. The information derived by the deriving unit 130 is transmitted to the determination unit 140. The deriving function by the deriving unit 130 may be one of features of the displacement sensor 120 or a separate feature from the displacement sensor 120.

The determination unit 140 is a device for determining the mode of the side impact on the vehicle 10 based on the information transmitted from the deriving unit 130 and for controlling the airbag module 150 based on the determination. Specifically, the determination unit 140 includes a CPU (central processing unit), an input output unit, a storage unit, a driving unit, a peripheral unit, and the like. The determination unit 140 may be configured as all or a part of an electrical control unit (ECU) as an actuation control device for controlling the actuation of an engine/running system and an electrical system. In the determination unit 140, the means for determining the mode of the side impact on the vehicle 10 and the means for outputting a control signal to the airbag module 150 may be configured as separate means. The determination unit 140 may also be considered a control device and/or a control signal output device.

The airbag module 150 comprises at least an airbag and a gas generator, but not shown. The airbag is expandable and is adapted to be deployed and expanded into an occupant restraint region with gas supplied from the gas generator when occurrence of an accident of the vehicle 10 is detected. The airbag module 150 is configured to restrain the vehicle occupant C in the event of a vehicle accident. The airbag module 150 may also correspond to an occupant restraint apparatus and/or an object to be controlled.

The occupant restraint system 100 may include another occupant restraint apparatus instead of or in addition to the airbag module 150. For example, the occupant restraint system may include a seat belt device and a warning device for outputting warning such as display and sound.

Figure 2:
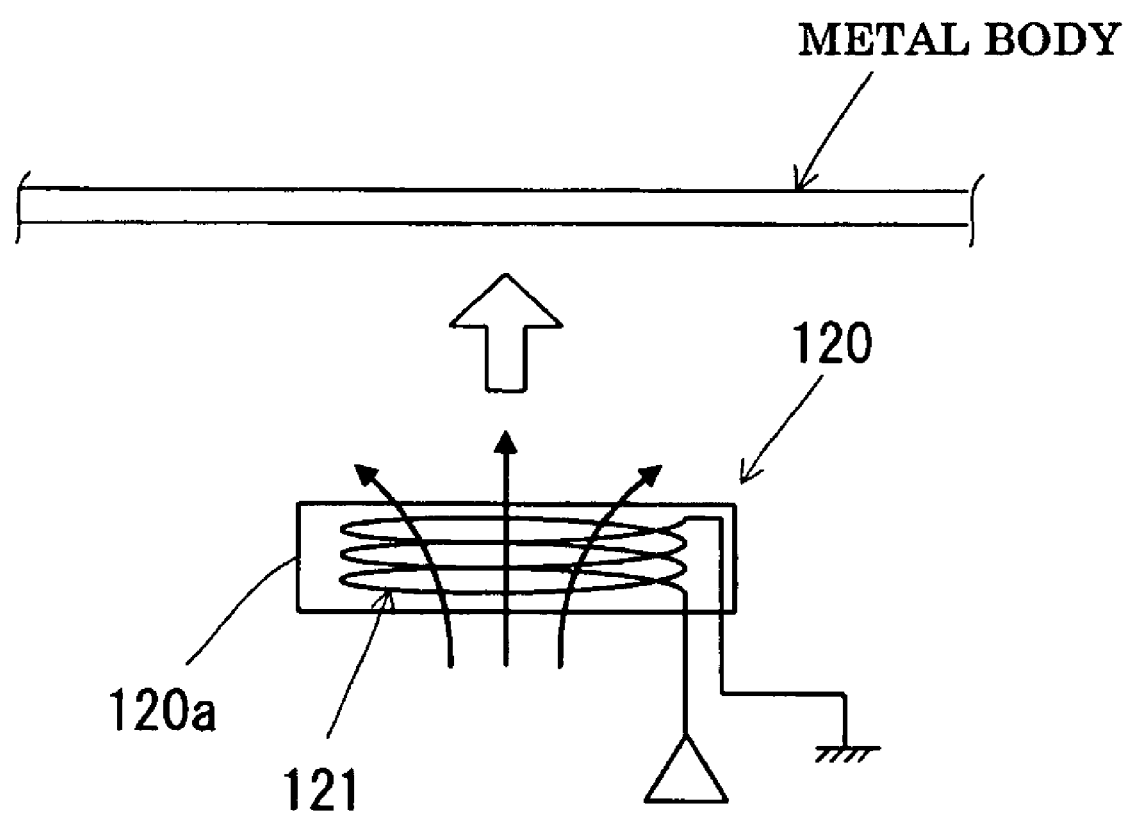
FIG. 2 is an illustration showing the basic structure of a displacement sensor according to an exemplary embodiment.
Figure 3:
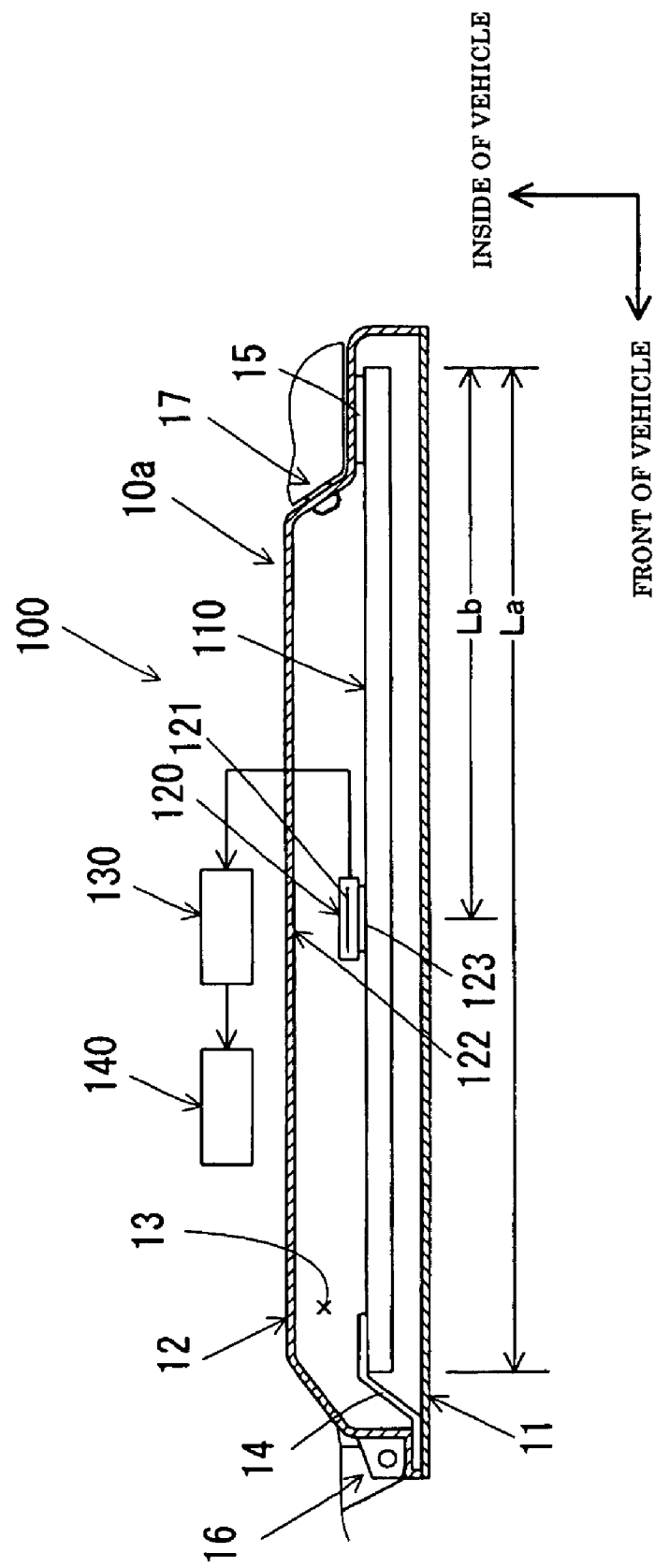
FIG. 3 is an illustration schematically showing the sectional structure of the vehicle door in which the displacement sensor of FIG. 2 is installed.

Referring to FIGS. 2 and 3, the displacement sensor 120 and peripheral components are shown according to an exemplary embodiment. FIG. 2 shows the basic structure of the displacement sensor 120 of this embodiment and FIG. 3 schematically shows the sectional structure of the vehicle door 10a in which the displacement sensor 120 is installed.

As shown in FIG. 2, the displacement sensor 120 of this embodiment is a coil sensor comprising a sensor housing 120a and a coil 121 that is formed by winding a wire into a full circle one time or several times and which is accommodated in the sensor housing 120a. In this case, the displacement sensor 120 is preferably disposed such that the extending surface of the coil 121 extends substantially parallel to a detection surface of a metal body. By the actuation of an AC power source (not shown), the coil 121 is energized with alternative current (sinusoidal current) and an AC magnetic field is applied to the metal body (conductive body or magnetic body) near the coil 121. Accordingly, an eddy current is produced on the metal body according to the principles of electromagnetic introduction. The eddy current produces a magnetic field and a part of the magnetic field intersects with the coil 121. As a result, the magnetic flux by the eddy current flowing through the metal body is added to the magnetic flux by the current supplied from the AC power source unit. By these magnetic fluxes, an induced voltage is produced in the coil 121. The displacement sensor 120 can detect the distance between the metal body and the displacement sensor 120 based on the variation in current flowing through the coil 121. The metal body in this case is an object to be detected by the coil sensor and is formed of a conductive member or a magnetic member containing, for example, steel, aluminum, and/or ferrite. Since the aluminum has high conductivity so that large eddy current is produced by the coil sensor, the metal body is advantageously made of a metal containing aluminum because of improvement of detection sensitivity. If the distance between the coil sensor and the metal body is, for example, about 40 mm in the initial state, use of a coil 121 of 80 mm or more in diameter enables improvement of detection sensitivity.

As shown in FIG. 3, the vehicle door 10*a* is connected to a vehicle body 17 via door hinges 16 and comprises a door outer panel 11 and a door inner panel 12. The vehicle door 10*a* may be a front seat door which is disposed between an A-pillar and a B-pillar or a rear seat door which is disposed between a B-pillar and a C-pillar. In a space 13 defined by the door outer panel 11 and the door inner panel 12, a door beam 110 is arranged.

The door beam 110 is a cylindrical, rod-like, or column-like member extending lengthwise in the anteroposterior (e.g., front to back) direction of the vehicle. One end of the door beam 110 is fixed to the vehicle body 17 via a vehicle front side bracket 14, while the other end of the door beam 110 is fixed to the vehicle body 17 via a vehicle rear side bracket 15. That is, the door beam 110 is fixed at both ends corresponding to the brackets 14 and 15 to extend lengthwise between the front end of the door (the vehicle front side bracket 14) and the rear end of the door (the vehicle rear side bracket 15) in the anteroposterior direction of the vehicle. In this arrangement, the door beam 110 can be deflected toward the inside of the vehicle (i.e. be deformed into an arched shape) according to the deformation of the door outer panel 11 in the event of a vehicle side impact crash. The door beam 110 is disposed adjacent to the door outer panel 11 and the number of the door beams 110 is one or more. The door beam 110 may be considered an elongated member.

The door beam 110 is typically composed of a metallic pipe, a press product of steel plate, or an aluminum extrusion member and has at least one of the function of preventing the vibration and/or deformation of the door outer panel 11, the function of preventing a colliding object from entering into the inside of the vehicle when the vehicle collides with the colliding object from the side, and the function of transmitting load produced at the side impact with the colliding object to the vehicle body. The door beam 110 extends overall the vehicle door 10*a* in the anteroposterior direction and has a feature capable of deforming into an arched shape toward the inside of the vehicle without buckling distortion in the event of an side impact crash with a colliding object such as a pole.

By detecting displacement information of the door beam 110 (i.e. by monitoring the door beam 110) it is possible to quickly and properly determine the mode of a side impact in the early stage of the side impact crash of the vehicle 10 and, in addition, it is possible to stably detect a side impact in a wide range of the vehicle door 10*a* because the door beam 110 extends over a wide range of the vehicle door 10*a* in the vehicle anteroposterior direction. Specifically, as shown in FIG. 3, the displacement sensor 120 having the aforementioned structure is placed in a setting area 123 among portions of the door beam 110 to face a confronting surface 122 of the door inner panel 12. By using displacement information from the displacement sensor 120, the relative displacement and displacement speed of the setting area 123 relative to a vehicle body member specifically such as the door inner panel 12 are detected. Though the setting area 123 is provided on the door beam 110, the setting area 123 may be set directly on the door beam 110 or set on another member fixed to the door beam 110.

The nearer the middle portion of the door beam 110, the larger the amount of displacement is. In this embodiment, accordingly, the setting area 123 to which the displacement sensor 120 is attached is preferably provided at the middle portion of the door beam 110 in the longitudinal direction among portions of the door beam 110. This arrangement facilitates detection of displacement information of the setting area 123. As taking the detection performance into consideration, the setting area 123 can be typically provided at a location satisfying a relation $(1/5) \times La < Lb < (4/5) \times La$. Further, as taking the influence of deformation delay of the door beam 110 in case of a side impact crash with a pole, the setting area 123 can be provided at a location satisfying a relation $(1/4) \times La < Lb < (2/4) \times La$.

Figure 4:
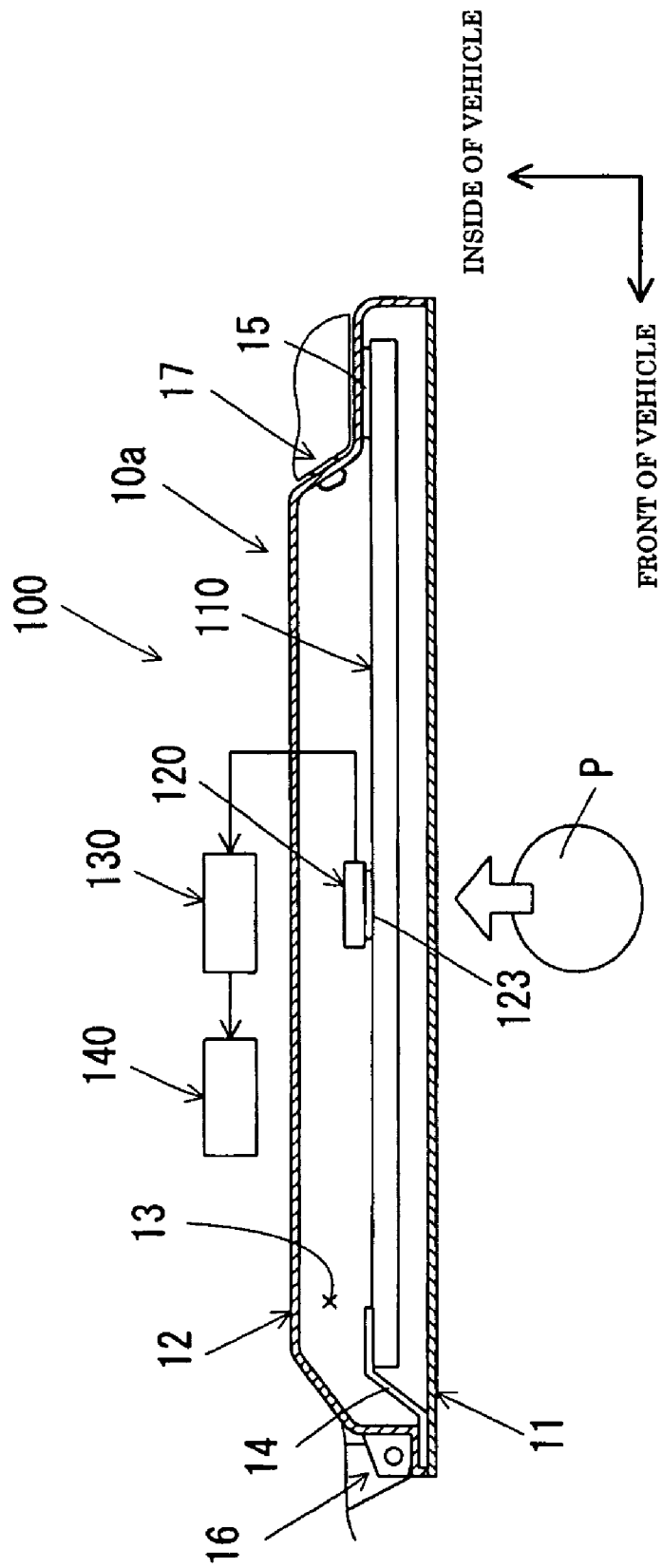
FIG. 4 is an illustration schematically showing a section of the structure of the vehicle door in the occupant restraint system before the vehicle door collides with a pole from the side.
Figure 5:
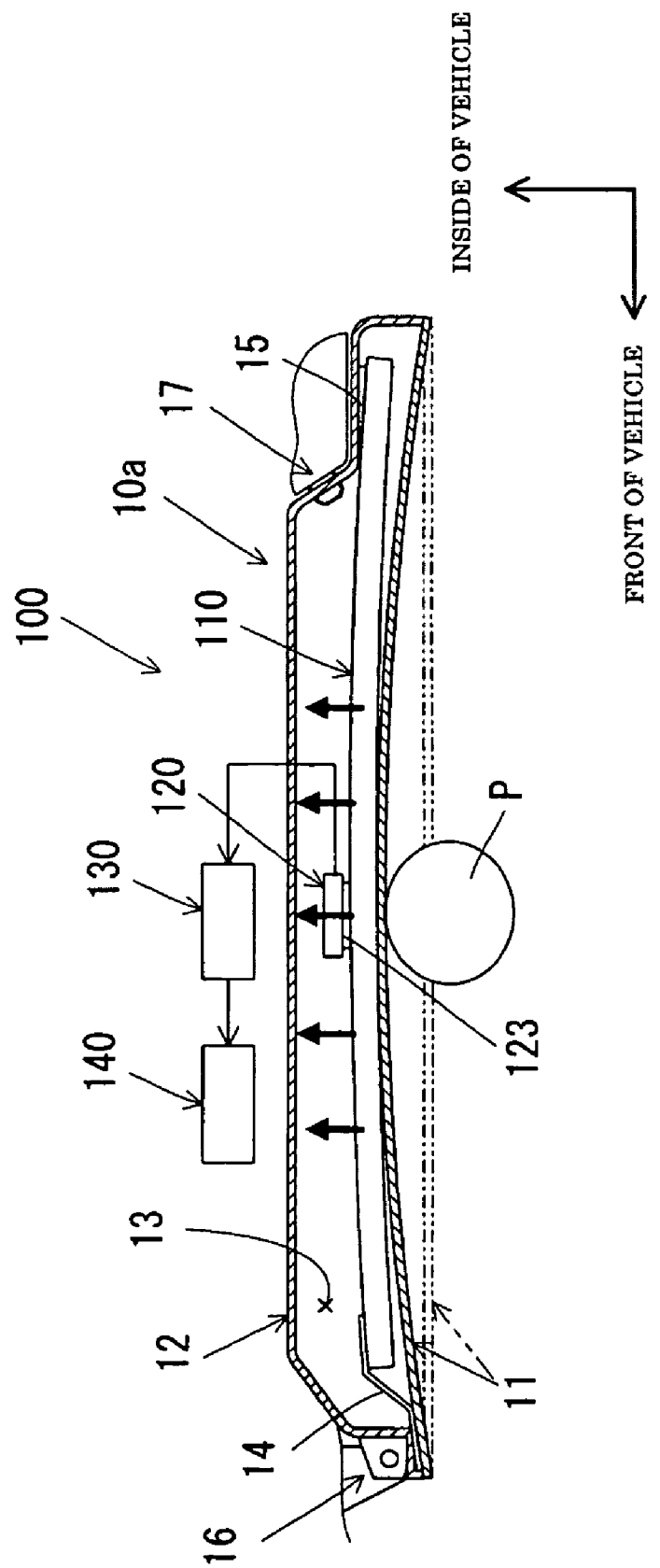
FIG. 5 is an illustration schematically showing a section of the structure of the vehicle door of FIG. 4 when the vehicle door collides with a pole from the side.

FIGS. 4-9 show the action of the occupant restraint system 100 according to an exemplary embodiment. FIG. 4 schematically shows a section of the structure of the vehicle door 10*a* in the occupant restraint system 100 of this embodiment before the vehicle door 10*a* collides with a pole P (i.e., a utility pole) from the side and FIG. 5 schematically shows a section of the structure of the vehicle door 10*a* when the vehicle door 10*a* collides with the pole P from the side.

The door outer panel 11 of the vehicle door 10*a* as shown in FIG. 4 is subjected to an impact from the side (from the lower side in FIG. 4) and is thus displaced (e.g., "deformed" or "moved") to the inside of the vehicle (to the upper side in FIG. 4).

The door outer panel 11 shown in FIG. 4 is displaced from a position shown by two dot chain lines in FIG. 5 to a position shown by solid lines in FIG. 5 by a side impact crash with the pole P. According to this displacement, the door beam 110 pressed via the door outer panel 11 is deflected and moved toward the inside of the vehicle. During the deflection of the door beam 110, the displacement sensor 120 moves together with the setting area 123 toward the confronting surface 122 of the door inner panel 12 and is thus displaced to the inner side of the vehicle.

When the displacement sensor 120 and the setting area 123 are displaced from the state shown in FIG. 4 to the state shown in FIG. 5, the confronting surface 122 of the door inner panel 12 is detected by the displacement sensor 120. Specifically, based on the variation in electric current flowing through the coil 121 of the displacement sensor 120, the moving distance between the displacement sensor 120 (virtually the setting area 123) and the confronting surface 122 (the amount of displacement) is successively detected by the deriving unit 130. The process described herein may be considered a step for detecting information about the displacement of the setting area toward the inside of the vehicle by the detection sensor during the deflection of the elongated member toward the inside of the vehicle.

Figure 6:
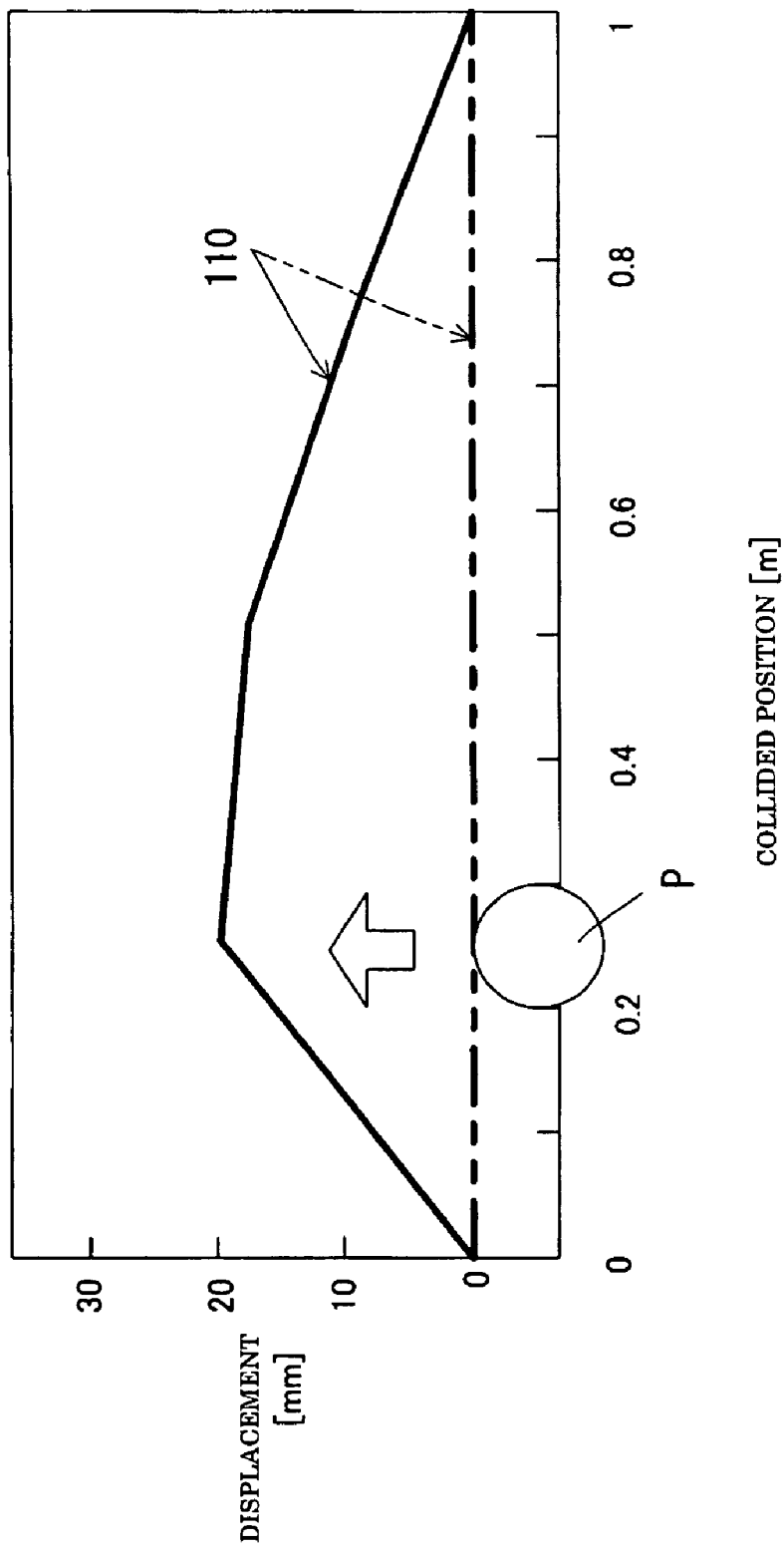
FIG. 6 is an illustration showing a pole colliding with a door beam at a point.
Figure 7:
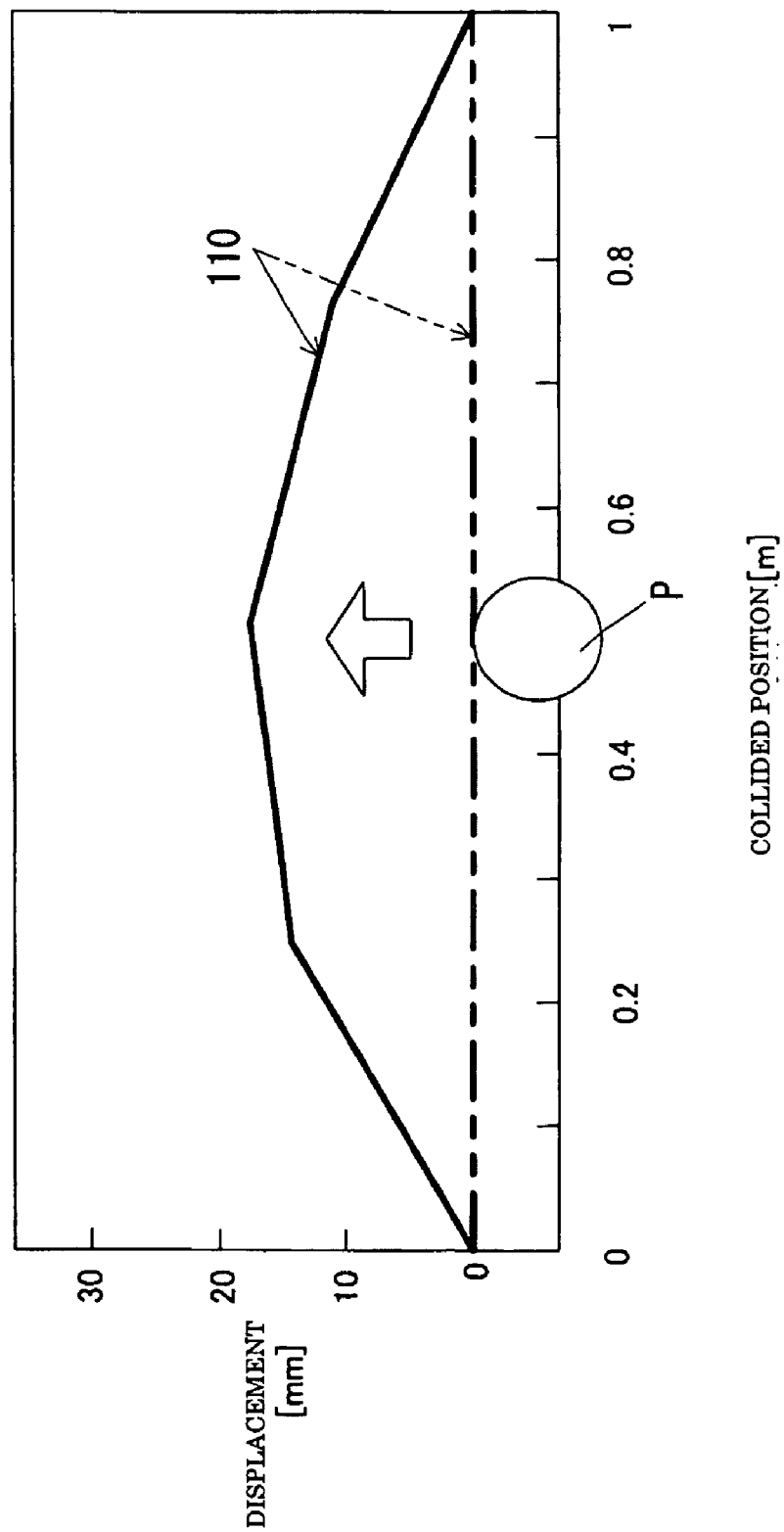
FIG. 7 an illustration showing a pole colliding with a door beam at a point.

As specific examples in which the door beam 110 is deflected toward the inside of the vehicle by a side impact crash with the pole P, FIG. 6 and FIG. 7 show deflection states in which the pole P collides with the door beam 110 having a length of 1 m. FIG. 6 shows a case that the pole P collides with a portion about 0.25 m point of the door beam 110 having a length of 1 m and FIG. 7 shows a case that the pole P collides with a portion about 0.5 m point of the door beam 110 having a length of 1 m. As apparent from FIG. 6 and FIG. 7, the door beam 110 is deformed into similar arc shape even though the pole colliding position relative to the door beam 110 is different.

The metal body composing the confronting surface 122 of the door inner panel 12 is formed of a conductive member or a magnetic member containing, for example, steel, aluminum, and/or ferrite. The metal body is advantageously made of a metal containing aluminum because of improvement of detection sensitivity. The confronting surface 122 may be flat, curved, or stepped. According to one exemplary embodiment, the confronting surface 122 is preferably a flat surface because of improvement of detection sensitivity.

Based on the information transmitted from the displacement sensor 120, the deriving unit 130 outputs a signal indicating the relative displacement and the displacement speed of the displacement sensor 120 relative to the door inner panel 12 (the vehicle body side member). The outputting process described herein may be considered a step for deriving the displacement and the displacement speed of the setting area relative to a vehicle body side member based on the detected information. The outputting process of the deriving unit 130 will be described with reference to FIG. 8. Specifically, based on the variation in electric current flowing through the coil 121 of the displacement sensor 120, the distance between the displacement sensor 120 (virtually the setting area 123) and the door inner panel 12 is successively detected by the deriving unit 130.

Figure 8:
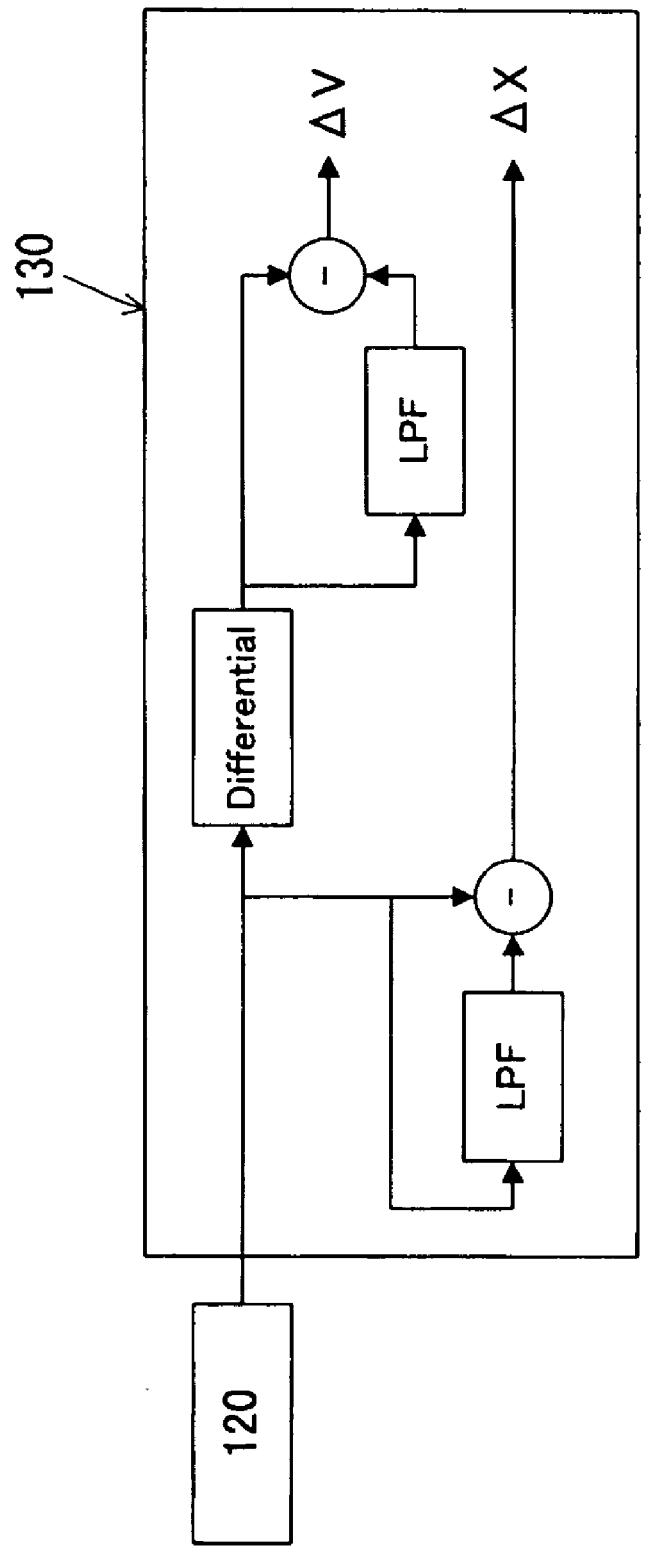
FIG. 8 is an illustration showing a calculation process for a deriving unit in the occupant restraint system.

FIG. 8 shows a calculation process by the deriving unit 130 in the occupant restraint system 100 of this embodiment. As shown in FIG. 8, the deriving unit 130 outputs the relative displacement (hereinafter, sometimes called "displacement $\Delta X$") of the setting area 123 relative to the door inner panel 12 based on the displacement information detected by the displacement sensor 120 and further outputs relative displacement speed (hereinafter, sometimes called "displacement speed $\Delta V$") of the setting area 123 relative to the door inner panel 12 by differential processing of the displacement information detected by the displacement sensor 120. Further, based on the displacement $\Delta X$ and the displacement speed $\Delta V$ outputted from the deriving unit 130, the determination unit 140 conducts a process of determining the mode of the side impact. Specifically, the determination unit 140 determines whether or not the occurred side impact is likely to need to actuate the airbag module 150. The determination may be made directly using outputted information of the displacement $\Delta X$ and the displacement speed $\Delta V$ outputted from the deriving unit 130 or using information after a filtering process or an integration process. The determination process described herein may be considered to be a step for determining the mode of the side impact on the vehicle based on the derived information. The criterion for the determination will be described with reference to FIG. 9.

Figure 9:
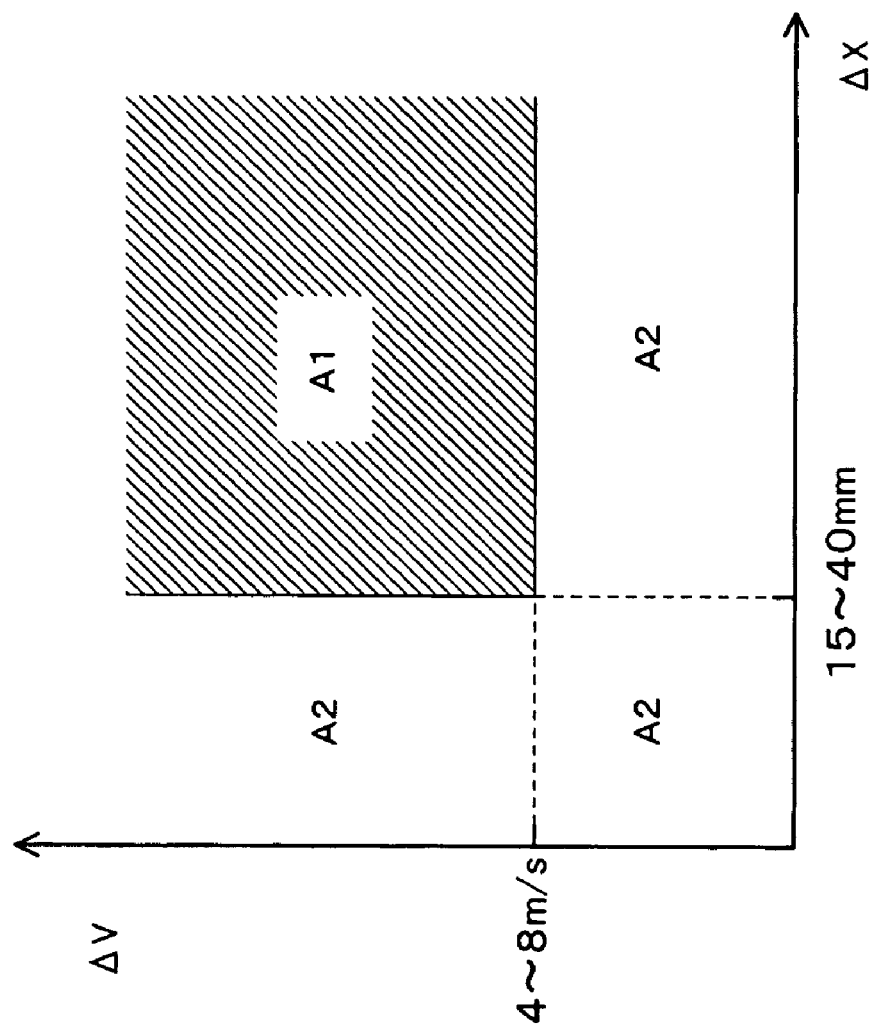
FIG. 9 is an illustration showing the criterion for a determination unit.

FIG. 9 shows the criterion for determination by the determination unit 140 of this embodiment. The criterion for the determination may be directly used for the outputted information such as the displacement $\Delta X$ and the displacement speed $\Delta V$ or for the information after the filtering process or the integration process. As shown in FIG. 9, in this embodiment, when the correlation between the displacement $\Delta X$ and the displacement speed $\Delta V$ is in a region A1 where the displacement $\Delta X$ exceeds 15-40 mm and the displacement speed $\Delta V$ exceeds 4-8 m/sec, the determination unit 140 determines that the occurred side impact is in a mode which is likely to need to immediately restrain the vehicle occupant and outputs an actuation signal to the airbag module 150. The criterion for determination defines the side impact as an impact capable of damaging the vehicle occupant because of further intrusion of the object into the vehicle door 10a according to several factors. First, an object having sufficient force to deform the door beam 110 is involved in the side crash and thus actually causes apparent deformation of the door beam 110 to crash the vehicle door 10a. Second, based on the displacement speed $\Delta V$, the colliding speed of an object deforming the vehicle door 10a is a certain value or more so that the deformation proceeds. Third, based on both the displacement $\Delta X$ and the displacement speed $\Delta V$, a large and heavy object deforms the vehicle door 10a to a predetermined level or more and the deformation proceeds at a predetermined speed or more.

When the correlation between the displacement $\Delta X$ and the displacement speed $\Delta V$ is in a region A2 (e.g., not in the region A1), the determination unit 140 does not output an actuation signal to the airbag module 150. The region A2 includes a situation where the displacement speed $\Delta V$ is relatively high and the displacement $\Delta X$ is relatively small, for example, where the impact is not likely to need to immediately restrain the vehicle occupant, and a case where the displacement speed $\Delta V$ is relatively low and the displacement $\Delta X$ is relatively large, for example, where the vehicle door collides with an object other than road structures and roadside structures, for example, a shopping cart, a ball, or a bat so that the vehicle door is reversibly displaced.

When the determination unit 140 outputs an actuation signal to the airbag module 150, the airbag of the airbag module 150 is deployed and inflated so that the airbag absorbs impact force acting on the side (head, neck, shoulder, chest, abdomen, knee, leg, etc.) of the vehicle occupant (the vehicle occupant C in FIG. 1), thereby restraining the occupant.

As mentioned above, according to the occupant restraint system 100 of this embodiment, the impact mode of the side impact crash of the vehicle 10 can be quickly and properly detected. That is, the setting area 123 is provided on the long door beam 110 which can be deflected to the inside of the vehicle according to the deformation of the door outer panel 11 in the event of a vehicle side impact crash and information about displacement of the setting area 123 is detected by the displacement sensor 120, thereby quickly determining the mode of the side impact. According to one exemplary embodiment, the mode of the side impact on the vehicle 10 can be determined in a short time (i.e., about 5-8 msec), before the vehicle door 10a is displaced for example about 20 mm by the side impact.

In addition, since the mode of the side impact on the vehicle 10 is determined based on the both information about the displacement and the displacement speed of the setting area 123 relative to the door inner panel 12 derived by the deriving unit 130, it is possible to properly determine whether the occurred side impact is likely to need to immediately restrain the vehicle occupant or is a minor impact which is not likely to need or does not need to immediately restrain the vehicle occupant, thereby effectively improving the accuracy of determination about the mode of the side impact.

Since the door beam 110 extends over a wide range of the vehicle door 10a in the vehicle anteroposterior direction, it is possible to stably detect a side impact in a wide range of the vehicle door 10a by setting the setting area 123 on the door beam 110. For example, it is possible to stably detect a side impact not only in case of the side impact crash with the pole as mentioned above that the vehicle collides with a pole P such as a utility pole, but also in case of a barrier impact crash that the vehicle collides with a wall or another vehicle.

In the aforementioned embodiment, employing the displacement sensor 120 including the coil sensor enables detection of only component approaching the coil 121 during the deflection of the door beam 110 toward the inside of the vehicle. Further, the coil sensor is a noncontact sensor and thus has characteristics that the coil sensor is resistant to shock, is not sensitive to the shock, and is hardly affected by environment. Therefore, the coil sensor is effective in ensuring the desired accuracy for detecting displacement information of the setting area 123.

According to this embodiment, the highly accurate information about the displacement of the setting area 123 obtained by the displacement sensor 120 is used to control the airbag module 150, thereby ensuring complete restraint of the vehicle occupant.

Further, according to this embodiment, a vehicle 10 is provided in which the highly accurate information about the displacement of the setting area 123 obtained by the displacement sensor 120 is used for controlling the airbag module 150 and a variety of other objects, to be controlled, about the vehicle 10.

Figure 10:
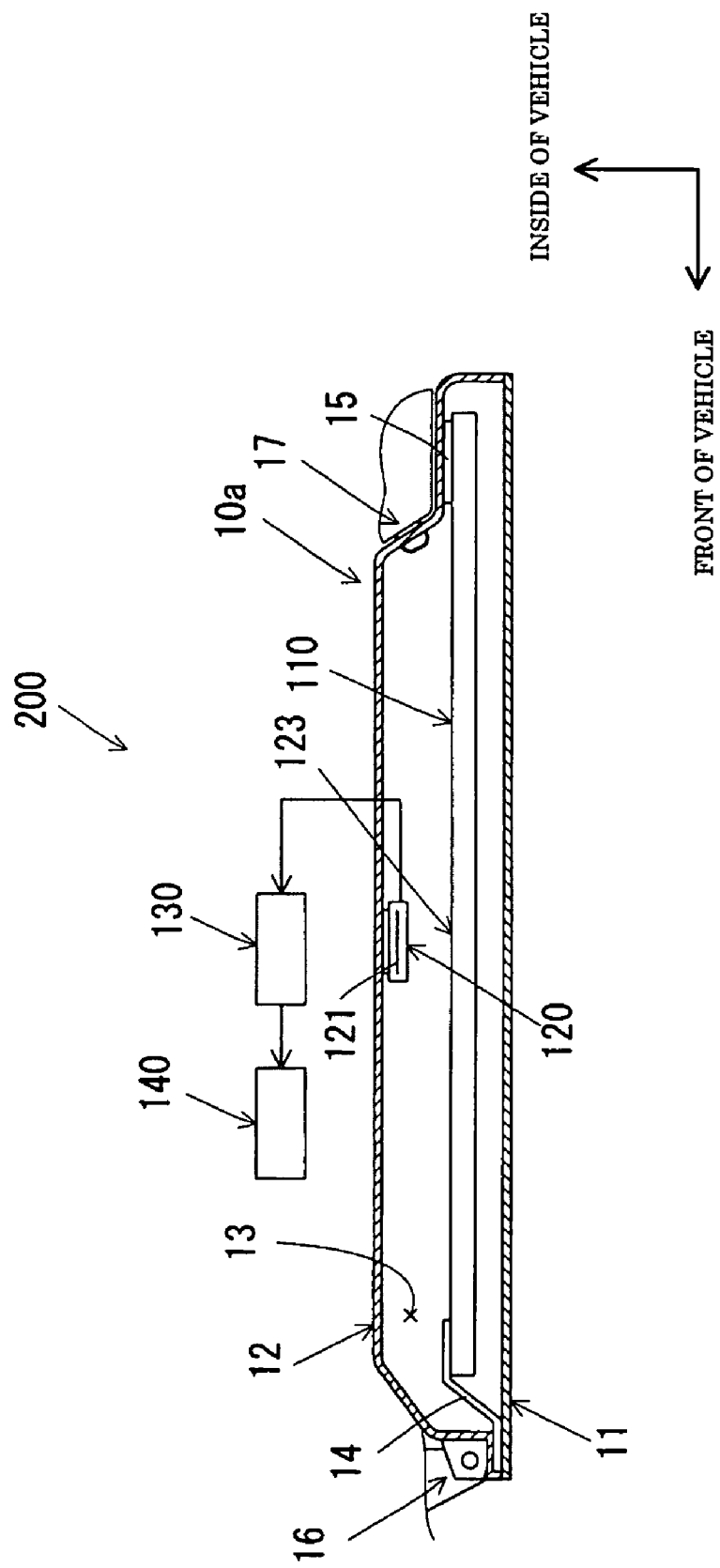
FIG. 10 is an illustration schematically showing a section of the structure of a vehicle door in an occupant restraint system according to an exemplary embodiment before the vehicle door collides with a pole from the side.
Figure 11:
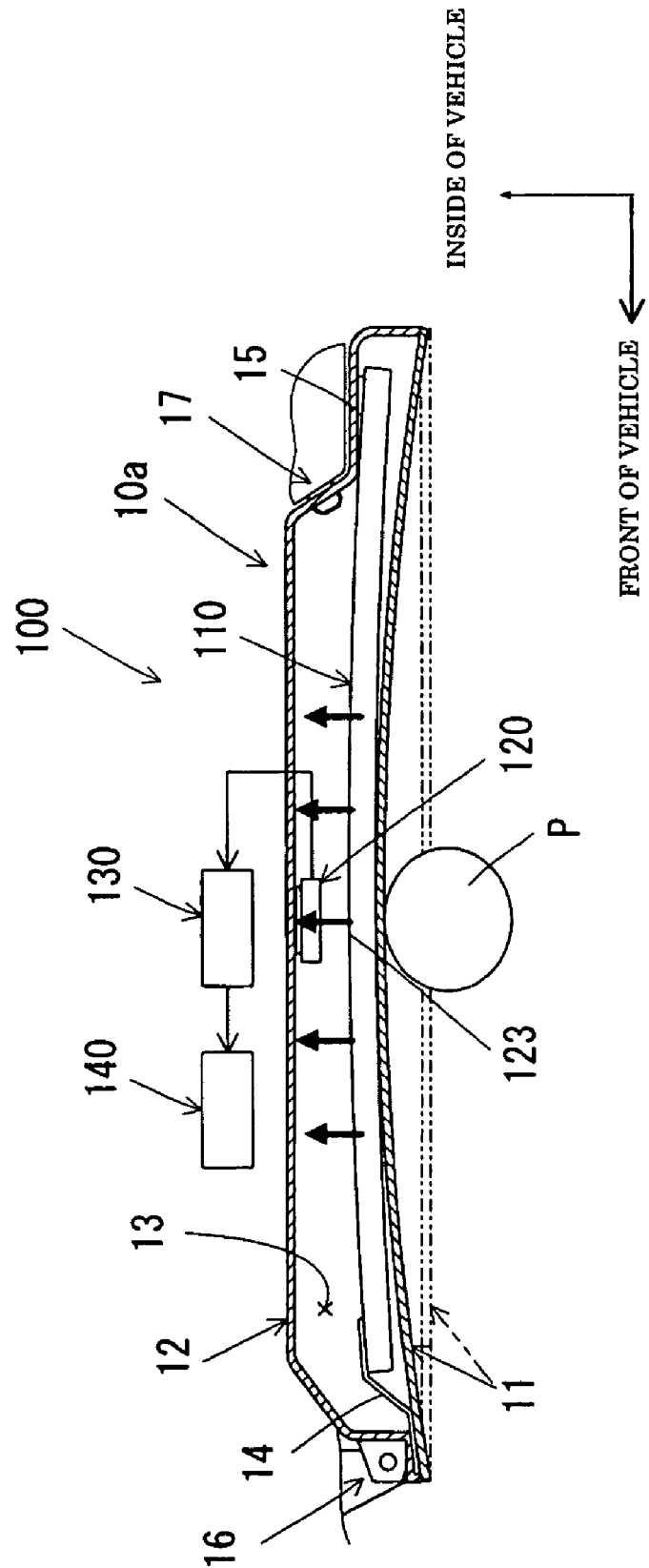
FIG. 11 is an illustration schematically showing a section of the structure of the vehicle door shown in FIG. 10 when the vehicle door collides with a pole from the side.

Though the aforementioned embodiment has been described with regard to a case that the displacement sensor 120 is attached to the predetermined setting area 123 facing the confronting surface 122 of the door inner panel 12 among portions of the door beam 110 as shown in FIG. 3, another style may be employed for the location of the displacement sensor 120. For example, the displacement sensor 120 may be attached to another elongated member similar to the door beam 110 in the space 13 inside the vehicle door 10a. Alternatively, the displacement sensor 120 may be attached to the door inner panel 12 of the vehicle door 10a. The case that the displacement sensor 120 is attached to the door inner panel 12 of the vehicle door 10a will be described with reference to FIG. 10 and FIG. 11. FIG. 10 schematically shows a section of the structure of the vehicle door 10a in an occupant restraint system 200 of this embodiment before the vehicle door 10a collides with a pole P from the side and FIG. 11 schematically shows a section of the structure of the vehicle door 10a when the vehicle door 10a collides with the pole P from the side.

In the occupant restraint system 200 shown in FIG. 10, the displacement sensor 120 is attached to a portion, facing the setting area 123 on the door beam 110, among portions of the door inner panel 12. The other components of the occupant restraint system 200 are the same as those of the aforementioned occupant restraint system 100. In this arrangement, the setting area 123 on the door beam 110 composing as a metal body as mentioned above is detected by the coil sensor composing the displacement sensor 120 when the door beam 110 is displaced from the state shown in FIG. 10 to the state shown in FIG. 11 due to a side impact crash of the vehicle 10. Though the setting area 123 is provided on the door beam 110, the setting area 123 may be the door beam 110 itself or another member fixed to the door beam 110.

Specifically, based on the variation in electric current flowing through the coil 121 of the displacement sensor 120, the distance between the displacement sensor 120 (virtually the door inner panel 12) and the setting area 123 (virtually the door beam 110) is successively detected by the deriving unit 130. The door beam 110 itself or the metal body composing the setting area 123 on the door beam 110 is formed of a conductive member or a magnetic member containing, for example, steel, aluminum, and/or ferrite. The metal body is advantageously made of a metal containing aluminum because of improvement of detection sensitivity. The door beam 110 itself or the surface, confronting the displacement sensor 120, of the setting area 123 may be flat, curved, or stepped. In particular, the door beam 110 itself or the confronting surface is preferably flat. In this case, improved detection sensitivity is obtained. Especially, in case where the door beam 110 is a pipe-like, a rod-like, and a corrugated-sheet-like member and the surface confronting the displacement sensor 120 is curved, it is preferable to employ such an arrangement that a metal body having a flat surface confronting the displacement sensor 120 is connected to the door beam 110 and the metal body is set as the setting area 123. Similarly to the aforementioned arrangement in which the displacement sensor 120 is attached to the door beam 110, this arrangement also enables the proper determination of the mode of the side impact on the vehicle 10.

Though the aforementioned embodiments have been described with regard to a case using the displacement sensor 120 composed of the coil sensor, another detection sensor may be employed instead of the coil sensor. For example, various sensors, such as an acceleration sensor, a strain sensor, an ultrasonic sensor, and an optical sensor, capable of directly or indirectly detecting the displacement, the displacement speed, or the displacement acceleration relating to the movement of the setting area 123 on the door beam 110 can be employed. In case of employing a strain sensor as the detection sensor of a different type, a strain sensor or a strain gauge is attached to the setting area 123 on the door beam 110 so that a relative displacement $\Delta X$ and a displacement speed $\Delta V$ of the setting area 123 relative to the vehicle body side member are outputted based on changes in curvature of the door beam 110. The case employing an acceleration sensor as the detection sensor of a different type will be described with reference to FIG. 12 through FIG. 15.

Figure 12:
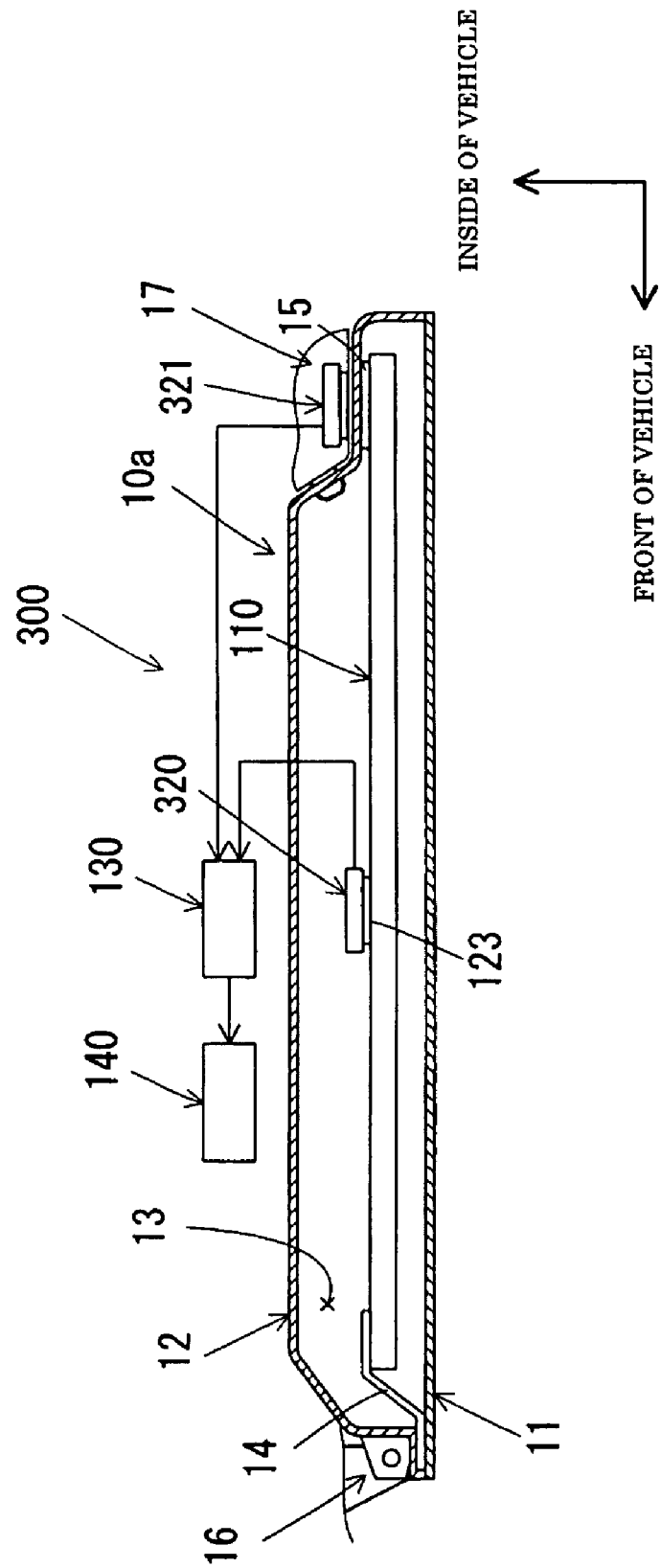
FIG. 12 is an illustration showing an arrangement of an occupant restraint system according to another exemplary embodiment.

FIG. 12 shows an arrangement of an occupant restraint system 300 of another embodiment in which an acceleration sensor 320 is attached to the setting area 123 on the door beam 110 and another acceleration sensor 321 is attached to the vehicle body 17. The acceleration sensor 320 is an acceleration sensor for detecting acceleration in three axis (X-axis, Y-axis, Z-axis) directions acting on the door beam 110. Similarly, the acceleration sensor 321 is an acceleration sensor for detecting acceleration in three axis (X-axis, Y-axis, Z-axis) directions acting on the vehicle body 17. The acceleration sensors 320 and 321 may be considered to be detection sensors and/or sensor devices. Other components of the occupant restraint system 300 are the same as those of the aforementioned occupant restraint system 100.

According to the arrangement, it is possible to detect, as the displacement information of the setting area 123, difference between displacement information detected by the acceleration sensor 320 on the door beam 110 and displacement information detected by the acceleration sensor 321 on the vehicle body 17. That is, this arrangement is based on such an idea that, since the relative displacement between the both ends of the door beam 110 and the vehicle body 17 in an early stage of a side impact crash of the vehicle 10 is small, relative deflection information of the setting area 123 relative to the vehicle body side member can be properly detected from the displacement information detected by the acceleration sensor 320 on the door beam 110 and the displacement information detected by the acceleration sensor 321 on the vehicle body 17. Specific calculating process of this case will be described with reference to FIG. 13.

Figure 13:
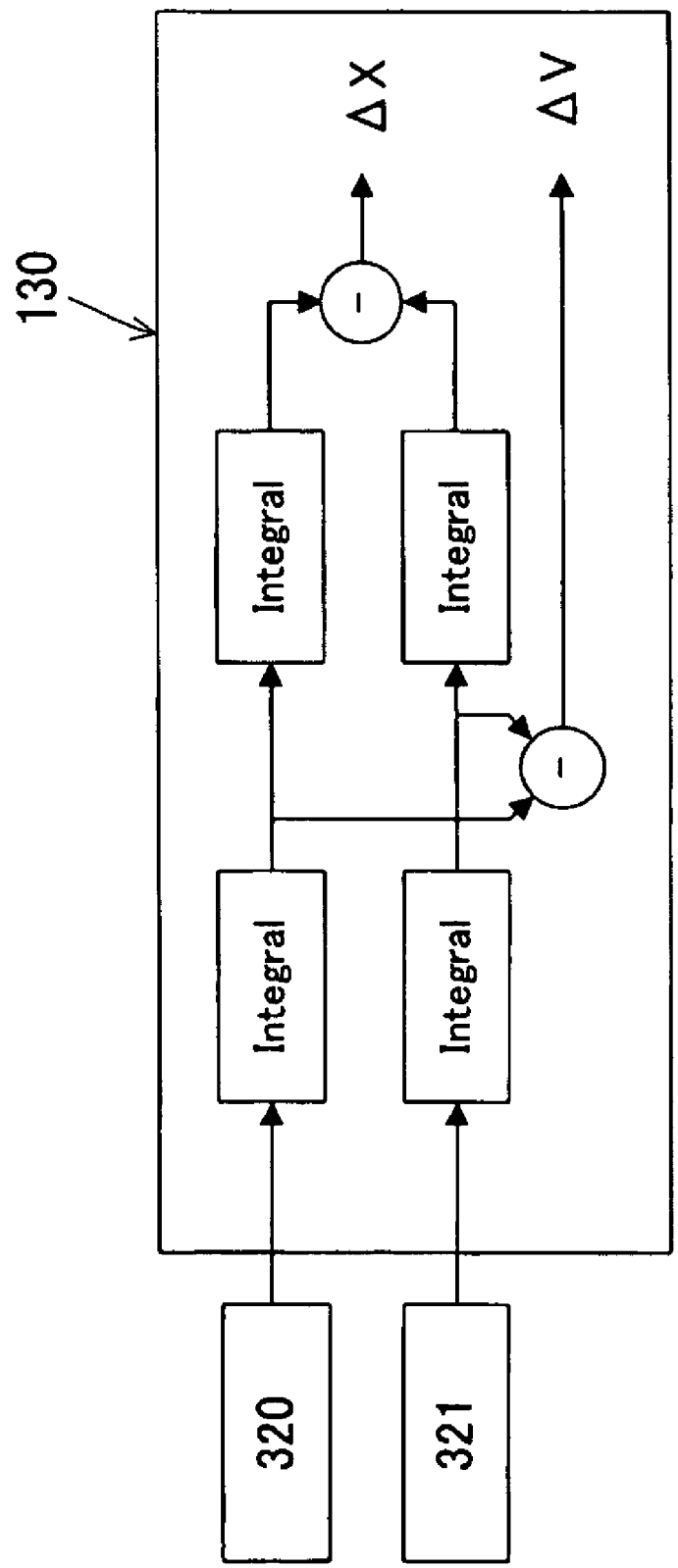
FIG. 13 is an illustration showing a calculating process by a deriving unit in the occupant restraint system according to another exemplary embodiment.

FIG. 13 shows a calculating process by the deriving unit 130 in the occupant restraint system 300 of another embodiment. As shown in FIG. 13, the deriving unit 130 outputs a relative displacement speed ΔV of the setting area 123 relative to the vehicle body side member (the vehicle body 17 itself) based on a value of integral of the displacement information detected by the acceleration sensor 320 and a value of integral of the displacement information detected by the acceleration sensor 321 and then outputs a relative displacement ΔX of the setting area 123 relative to the vehicle body side member (the vehicle body 17 itself) by the integral processing of the displacement speed. Similarly to the aforementioned arrangement using the displacement sensor 120, this arrangement also enables the proper determination of the mode of the side impact on the vehicle 10. As for this arrangement, the number of acceleration sensors 320 disposed on the door beam 110 may be one or more and the number of acceleration sensors 321 disposed on the vehicle body 17 may be one or more.

Figure 14:
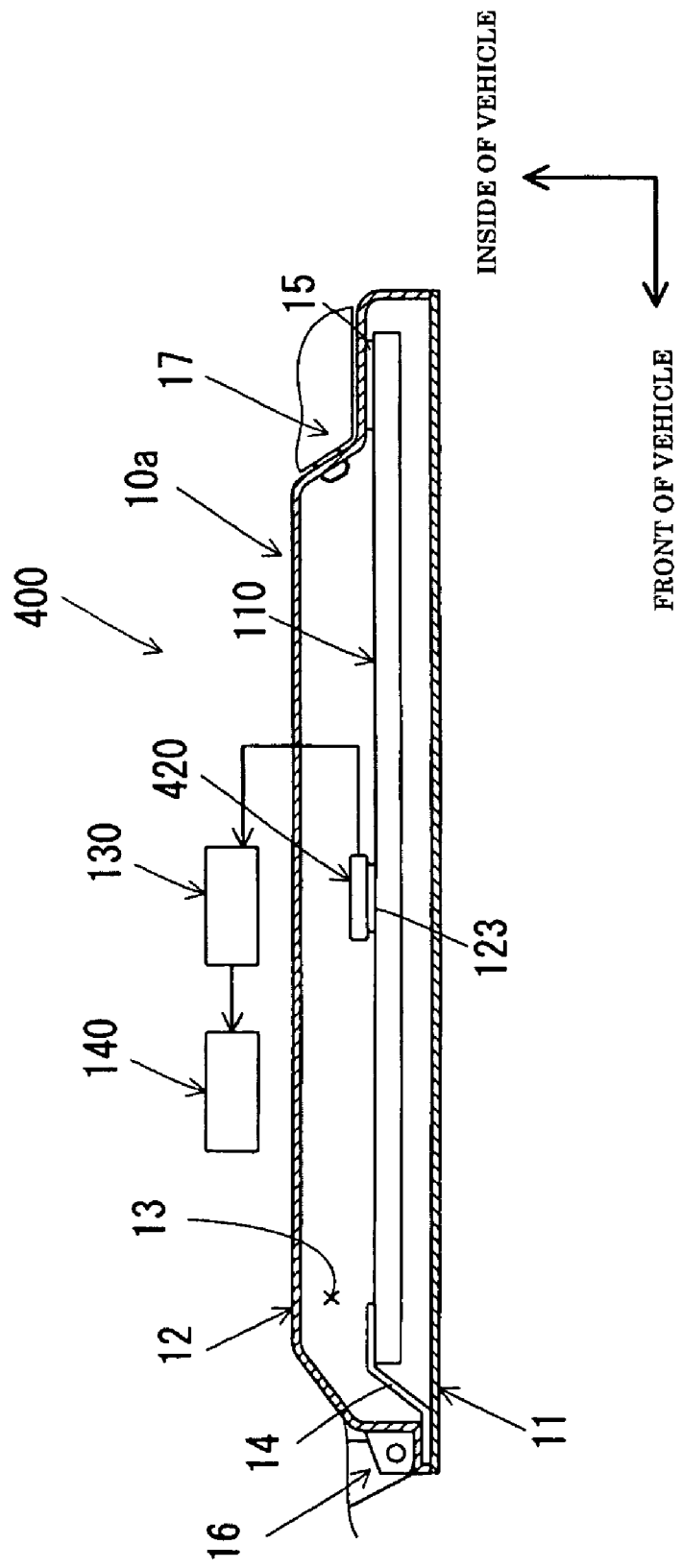
FIG. 14 is an illustration showing an arrangement of an occupant restraint system according to another exemplary embodiment.

FIG. 14 shows an arrangement of an occupant restraint system 400 of another embodiment in which an acceleration sensor 420 is attached to the setting area 123 on the door beam 110. The acceleration sensor 420 is an acceleration sensor for detecting acceleration in three axis (X-axis, Y-axis, Z-axis) directions acting on the door beam 110. The acceleration sensor 420 may be considered to be a detection sensor and/or a sensor device. Other components of the occupant restraint system 400 are the same as those of the aforementioned occupant restraint system 100.

According to the arrangement, it is possible to detect the displacement information of the setting area 123 only from displacement information obtained by the acceleration sensor 420 on the door beam 110. That is, this arrangement is based on such an idea that, since the displacement of the vehicle body 17 itself in an early stage of a side impact crash of the vehicle 10 is small, deflection information of the setting area 123 relative to the vehicle body side member can be properly detected only from the displacement information detected by the acceleration sensor 420 on the door beam 110. Specific calculating process of this case will be described with reference to FIG. 15.

Figure 15:
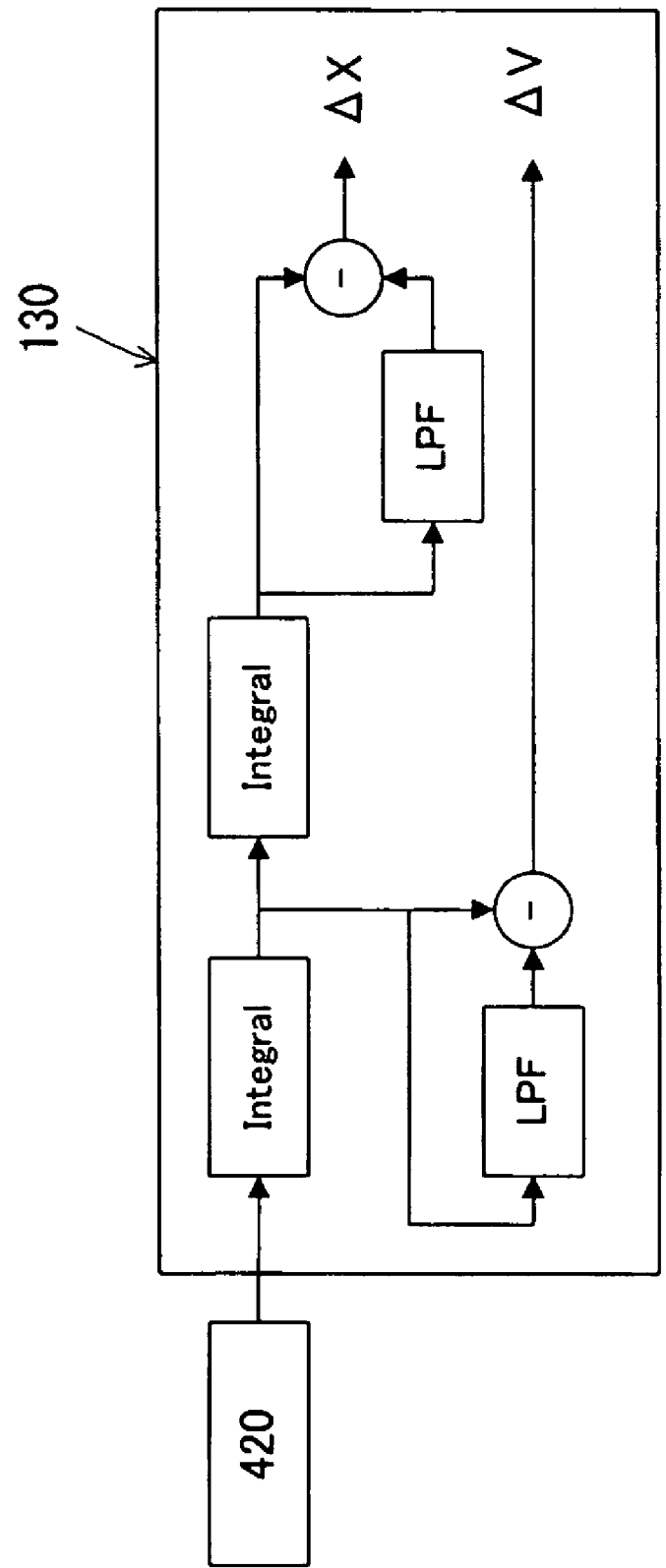
FIG. 15 is an illustration showing a calculating process by a deriving unit in the occupant restraint system according to another exemplary embodiment.

FIG. 15 shows a calculating process by the deriving unit 130 in the occupant restraint system 400 of another embodiment. As shown in FIG. 15, the deriving unit 130 outputs a relative displacement speed ΔV of the setting area 123 relative to the vehicle body side member (the vehicle body 17 itself) by integral processing of the displacement information detected by the acceleration sensor 420 and then outputs a relative displacement ΔX of the setting area 123 relative to the vehicle body side member (the vehicle body 17 itself) by the integral processing of the displacement speed. Similarly to the aforementioned arrangement using the displacement sensor 120, this arrangement also enables the proper determination of the mode of the side impact on the vehicle 10. Further, no sensor is needed on the vehicle body 17 side, thereby simplifying the structure. As for this arrangement, the number of acceleration sensors 420 disposed on the door beam 110 may be one or more.

The present invention is not limited to the aforementioned embodiments and various applications and modifications may be made. Though the aforementioned embodiments have been described with regard to a case that a determination logic (hereinafter, sometimes called "first determination logic") for impact mode determination using the beam displacement and the displacement speed is employed in determination of the determination unit 140, another determination logic may be employed in addition to the first determination logic. In this case, AND/OR operations are performed between different determination logics to obtain improved impact mode determination performance. The determination logic of a different embodiment will be described in FIG. 16 and FIG. 17.

Figure 16:
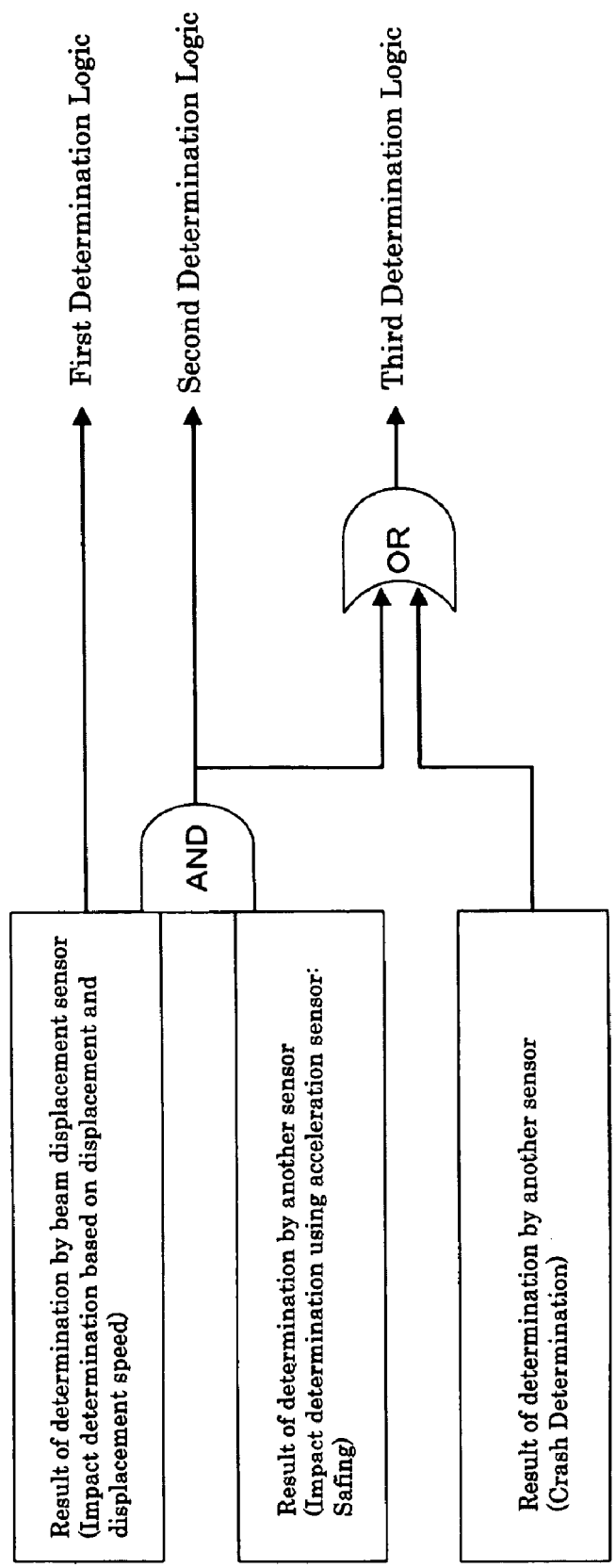
FIG. 16 is an illustration showing a determination logic according to another exemplary embodiment.
Figure 17:
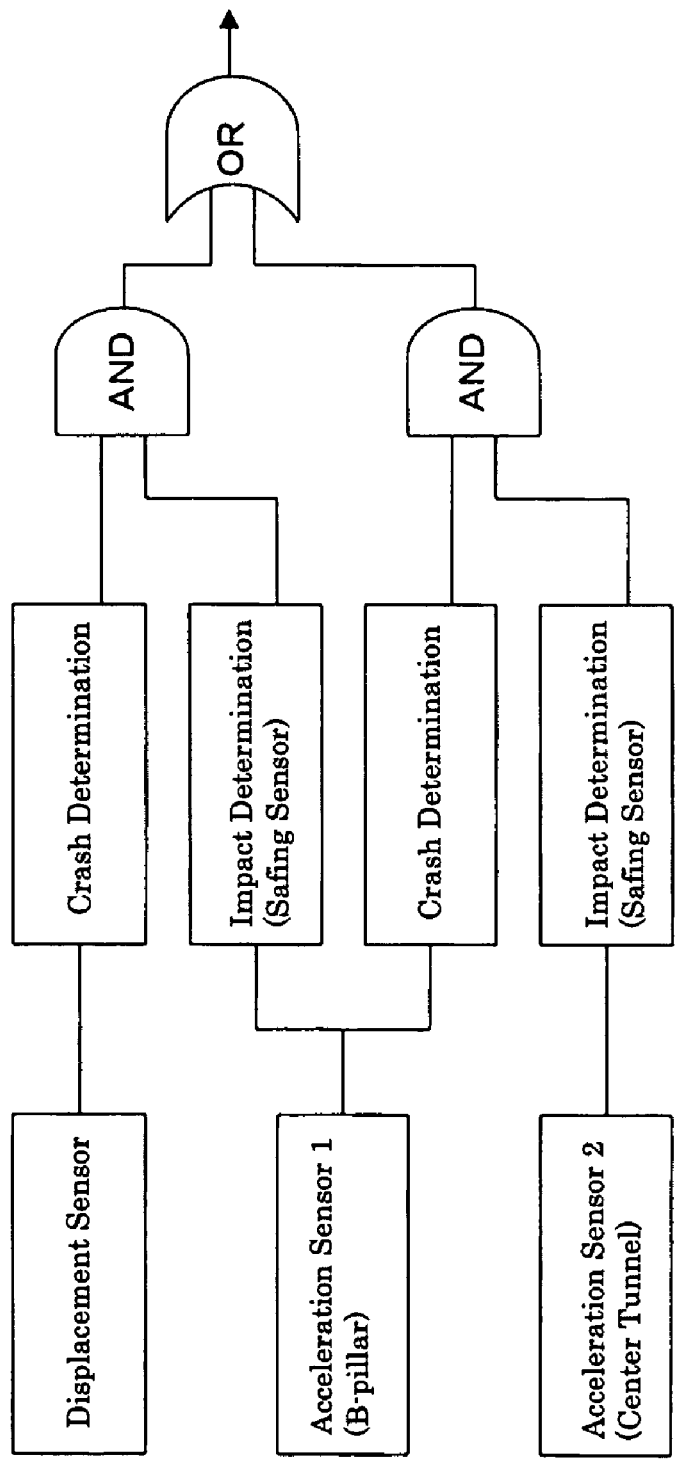
FIG. 17 is an illustration showing a determination logic according to another exemplary embodiment.

As shown in FIG. 16, the second determination logic uses an acceleration sensor placed on a B-pillar and/or an acceleration sensor placed on a center tunnel, and performs an AND operation between the determination result of the first determination logic and a determination result of a safing determination logic for quickly detecting an impact so as to reduce the possibility of failure while keeping the quick detection performance of the displacement sensor. The third determination logic performs an OR operation between the determination result of the second determination logic and a determination result of another crash determination logic (a crash determination logic using an acceleration sensor placed on a B-pillar and/or an acceleration sensor placed on a center tunnel) so as to determine the side impact according to a signal whichever is earlier, thereby improving the detection performance (see FIG. 17).

Figure 18:
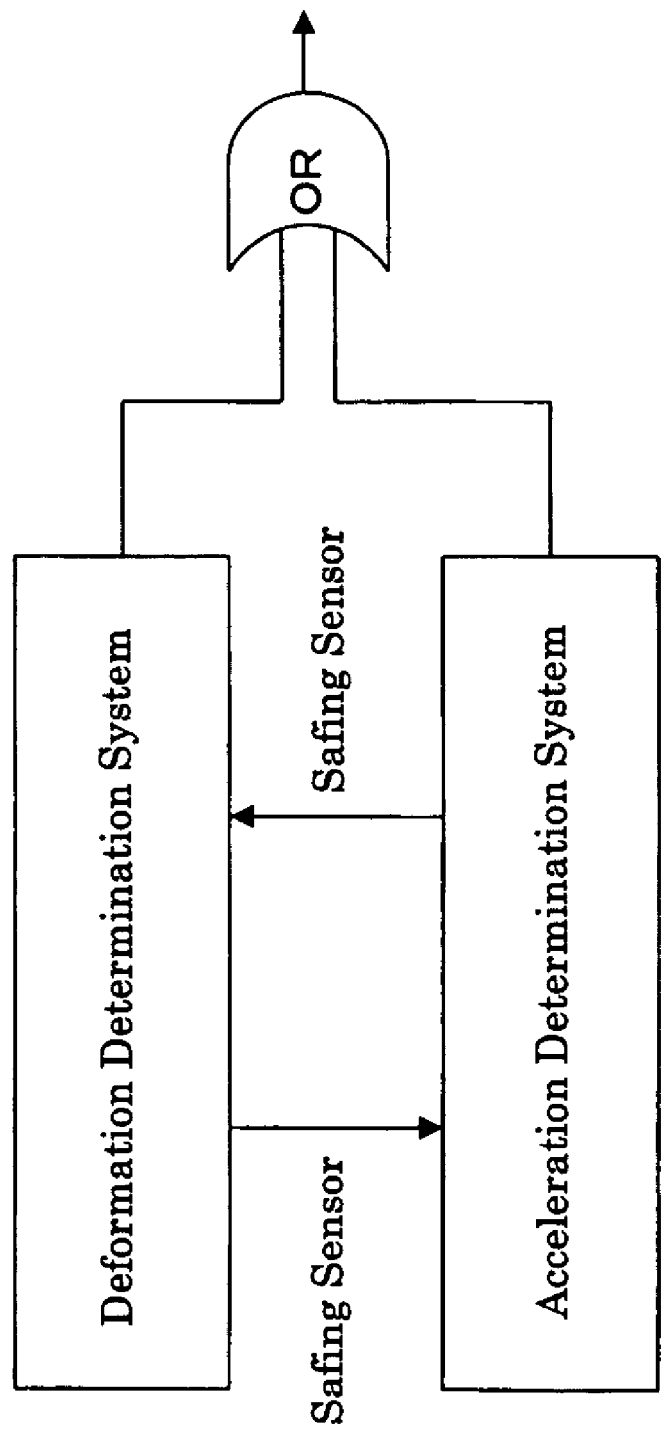
FIG. 18 is an illustration showing an arrangement in which the displacement sensor is used as a safing sensor.

As shown in FIG. 18, the beam displacement sensor as the aforementioned displacement sensor 120 is used as the safing sensor, thereby improving the crash determination characteristics of the acceleration sensor. The acceleration sensor produces a signal not only in case of a crush but also in cases that the vehicle travels on a rough road and that the bottom of the vehicle comes into contact with a rock because the acceleration sensor reacts to an impact. Therefore, the safing determination logic using the acceleration sensor has a problem that it outputs a signal even when no crush occurs. Since the crash determination logic using the acceleration sensor therefore takes a sufficient time to determine a crash, there is a limit to hasten the reaction. In case of using the safing determination logic using the beam displacement sensor, the beam displacement sensor does not produce a signal when the vehicle travels on a rough road or the bottom of the vehicle comes into contact with a rock. Therefore, it is possible to lower the determination threshold for determining a crash by the acceleration sensor and shorten the time for determination. Earlier crash determination is achieved by the crash determination logic using the beam displacement sensor, and earlier crash determination by the acceleration sensor is also achieved by using the beam displacement sensor as the safing sensor. In addition, the OR operation between them is performed, thereby further improving the total performance.

Figure 19:
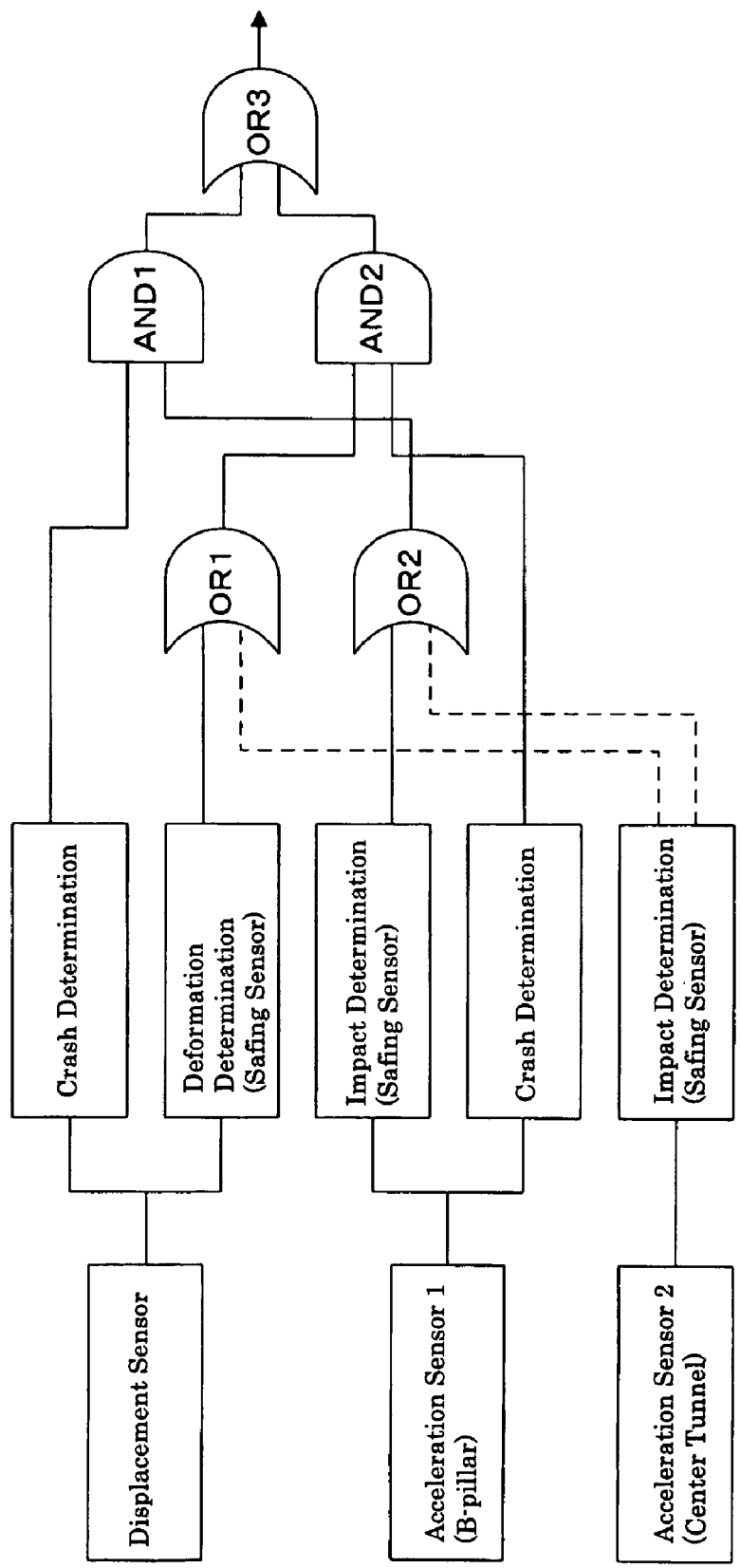
FIG. 19 is an illustration showing a determination logic according to an embodiment in which the displacement sensor and acceleration sensors are combined.

As shown in FIG. 19, as the arrangement of the combination of the displacement sensor with the acceleration sensors, an AND operation is performed between the crash determination by the acceleration sensor 1 and the safing by the displacement sensor. To improve the reliability, it is preferable that an OR operation is performed between the safing by the displacement sensor and the safing by the acceleration sensor 2 with increased threshold and the output of this OR operation is used as a safing to perform an AND operation relative to the crash determination by the acceleration sensor 1. Furthermore, an OR operation is performed between the output of the AND operation (output of AND2) and the crash determination by the displacement sensor (output of AND1). The output of this OR operation becomes a final determination. The safing determination logic by the displacement sensor 1) uses the same determination logic as that of the crash determination, 2) changes the threshold (changes the determination range) of the determination logic so as to make the determination earlier than the crash determination, or 3) make the determination only using the displacement or the displacement speed.

Though the aforementioned embodiments have been described with regard to a case of providing the setting area 123 on the door beam 110, the setting area 123 may be provided on an elongated member other than the door beam 110 that extends between the door front end and the door rear end in the space 13 defined by the door outer panel 11 and the door inner panel 12 of the vehicle door 10*a*.

Though the aforementioned embodiments have been described with regard to a case that information detected by the displacement sensor 120 and the acceleration sensors 320, 321, 420 is used to control the airbag module 150 which is actuated for restraining the vehicle occupant in the event of a vehicle side impact crash, information detected by the displacement sensor 120 and the acceleration sensors 320, 321, 420 may be used to control an occupant restraint apparatus such as a seat belt device and to control a warning device for outputting warning such as display and sound for informing the vehicle occupant of a vehicle side impact crash.

Though the aforementioned embodiments has been described with regard to the arrangement of the vehicle occupant restraint system to be installed in an automobile, the present invention can be adopted to occupant restraint systems to be installed in various vehicles such as an automobile, an airplane, a boat, a train, a bus, a truck, and the like.

The priority application, Japanese Patent Application No. 2007-274521, filed Oct. 22, 2007 including the specification, drawings, claims and abstract, is incorporated herein by reference in its entirety.

What is claimed is:

1. A side impact detection system for detecting information about a side impact of a vehicle, comprising:
   an elongated member that is disposed to extend between a door front end and a door rear end in a space defined by a door outer panel and a door inner panel of a vehicle door, the elongated member being capable of being deflected toward an inside of the vehicle according to a deformation of the door outer panel in an event of a vehicle side impact crash;
   a detection sensor for detecting information about displacement of a setting area that is previously set on the elongated member during the deflection of the elongated member toward the inside of the vehicle;
   a deriving unit for deriving the displacement and displacement speed of the setting area relative to a vehicle body side member based on the information detected by the detection sensor; and
   a determination unit for determining a mode of the side impact on the vehicle based on information derived by the deriving unit.

2. The side impact detection system as claimed in claim 1, wherein the detection sensor is structured integrally with the setting area and is disposed to face a confronting surface of the door inner panel and is configured to approach the confronting surface during the deflection of the elongated member toward the inside of the vehicle to detect information about displacement of the setting area.

3. The side impact detection system as claimed in claim 2, wherein the detection sensor includes a coil sensor that detects variation in electric current flowing through a coil disposed to face the confronting surface made of a metal and is adapted to detect information about displacement of the setting area based on the variation in electric current detected by the coil sensor during the deflection of the elongated member toward the inside of the vehicle.

4. The side impact detection system as claimed in claim 1, wherein the detection sensor is disposed on the door inner panel to face the setting area and is adapted to detect information about the displacement of the setting area approaching the detection sensor during the deflection of the elongated member toward the inside of the vehicle.

5. The side impact detection system as claimed in claim 4, wherein the detection sensor includes a coil sensor which detects variation in electric current flowing through a coil disposed to face the setting area made of a metal and is adapted to detect information about displacement of the setting area based on the variation in electric current detected by the coil sensor during the deflection of the elongated member toward the inside of the vehicle.

6. The side impact detection system as claimed in claim 1, further comprising an acceleration sensor for sensing lateral acceleration of the vehicle; wherein the determination unit is configured to make a crash determination based on information received from the deriving unit and/or the acceleration sensor.

7. The side impact detection system as claimed in claim 6, wherein the determination unit is configured to use the information derived by the deriving unit as safing for a crash determination made based on the information from the acceleration sensor.

8. The side impact detection system as claimed in claim 6, wherein the determination unit is configured to use the information from the acceleration sensor as safing for a crash determination made based on the information derived by the deriving unit.

9. An occupant restraint system comprising:
   a side impact detection system comprising:
      an elongated member that is disposed to extend between a door front end and a door rear end in a space defined by a door outer panel and a door inner panel of a vehicle door, the elongated member being capable of being deflected toward an inside of the vehicle according to deformation of the door outer panel in an event of a vehicle side impact crash;
      a detection sensor for detecting information about displacement of a setting area that is previously set on the elongated member during the deflection of the elongated member toward the inside of the vehicle;
      a deriving unit for deriving the displacement and displacement speed of the setting area relative to a vehicle body side member based on the information detected by the detection sensor;
   a determination unit for determining a mode of the side impact on the vehicle based on information derived by the deriving unit;
   an occupant restraint apparatus for restraining a vehicle occupant in the event of a vehicle side impact crash; and
   a control device for controlling the occupant restraint apparatus based on information determined by the determination unit of the side impact detection system.

10. The occupant restraint system as claimed in claim 9, wherein the detection sensor is structured integrally with the setting area and is disposed to face a confronting surface of the door inner panel and is configured to approach the confronting surface during the deflection of the elongated member toward the inside of the vehicle to detect information about displacement of the setting area.

11. The occupant restraint system as claimed in claim 9, wherein the detection sensor is disposed on the door inner panel to face the setting area and is adapted to detect information about the displacement of the setting area approaching the detection sensor during the deflection of the elongated member toward the inside of the vehicle.

12. The occupant restraint system as claimed in claim 9, further comprising an acceleration sensor for sensing lateral acceleration of the vehicle; wherein the determination unit is configured to make a crash determination based on information received from the deriving unit and/or the acceleration sensor.

13. The occupant restraint system as claimed in claim 12, wherein the determination unit is configured to use the information derived by the deriving unit as safing for a crash determination made based on the information from the acceleration sensor.

14. The occupant restraint system as claimed in claim 12, wherein the determination unit is configured to use the information from the acceleration sensor as safing for a crash determination made based on the information derived by the deriving unit.

15. A vehicle comprising:
an engine/running system;
an electrical system;
an actuation control device for conducting the actuation control of the engine/running system and the electrical system;
a vehicle door configured to be displaceable by a vehicle side impact;
a sensor device for detecting information about displacement of the vehicle door; and
a control signal output device for outputting control signal to an object to be controlled based on the information detected by the sensor device, wherein the sensor device comprises a side impact detection system comprising:
an elongated member that is disposed to extend between a door front end and a door rear end in a space defined by a door outer panel and a door inner panel of a vehicle door, the elongated member being capable of being deflected toward an inside of the vehicle according to deformation of the door outer panel in an event of a vehicle side impact crash;
a detection sensor for detecting information about displacement of a setting area that is previously set on the elongated member during the deflection of the elongated member toward the inside of the vehicle;
a deriving unit for deriving the displacement and displacement speed of the setting area relative to a vehicle body side member based on the information detected by the detection sensor; and
a determination unit for determining a mode of the side impact on the vehicle based on information derived by the deriving unit.

16. A side impact detection method for detecting information about a side impact on a vehicle, wherein a setting area is previously set on a elongated member that extends between a door front end and a door rear end in a space defined by a door outer panel and a door inner panel of a vehicle door, the elongated member being capable of being deflected toward an inside of the vehicle according to deformation of the door outer panel in an event of a vehicle side impact crash; and a detection sensor for detecting information about displacement of the setting area toward the inside of the vehicle is disposed on an area of the door inner panel confronting the setting area or arranged integrally with the setting area, the method comprising the steps of:
detecting information about the displacement of the setting area toward the inside of the vehicle by the detection sensor during the deflection of the elongated member toward the inside of the vehicle;
deriving the displacement and displacement speed of the setting area relative to a vehicle body side member based on the detected information; and
determining a mode of the side impact on the vehicle based on the derived displacement and displacement speed.

* * * * *